United States Patent [19]
Amdahl et al.

[11] Patent Number: 5,342,074
[45] Date of Patent: Aug. 30, 1994

[54] DUAL RECUMBENT VEHICLE

[75] Inventors: Keith L. Amdahl, Blaine; James M. Muellner, White Bear Lake, both of Minn.

[73] Assignee: Just Two Bikes, Inc., White Bear Lake, Minn.

[21] Appl. No.: 50,863

[22] Filed: Apr. 21, 1993

[51] Int. Cl.$^5$ .............................................. B62K 13/06
[52] U.S. Cl. .................................. 280/209; 280/282; 280/288.1
[58] Field of Search ............... 280/209, 202, 203, 282, 280/288.1

[56] References Cited

FOREIGN PATENT DOCUMENTS 848387 7/1939 France ................................. 280/209
506208 5/1939 United Kingdom ................. 280/209

OTHER PUBLICATIONS

Computerized database search of U.S. Class 280/209.
*Kingcycle* Product Literature (no date).
*Worksman* Product Literature (no date).
*Avatar 2000* Product Literature (no date).
*Trice* Product Literature (no date).
*Ross* Product Literature (no date).
*Rotator* Product Literature (no date).
*Adams Trail-A-Bike* Product Literature (no date).
*Rebike* Product Literature (no date).
*Selene Sport* Product Literature (no date).
*Surrey* Price List Document (no date).

*Primary Examiner*—Mitchell J. Hill
*Attorney, Agent, or Firm*—Merchant, Gould, Smith, Edell, Welter & Schmidt

[57] ABSTRACT

A dual recumbent vehicle is provided which includes a pair of recumbent bicycles interconnected in a side-by-side relationship. Each bicycle has an operator controlled steering assembly, an operator controlled drive assembly, and a recumbent seat operatively connected to a frame structure. Each of these bicycles is further connected by cross-braces for operatively connecting the bicycles in a side-by-side relationship, and a steering coupler for coupling the steering assemblies of each of the bicycles so that they operate in unison. A preferred dual recumbent vehicle can be steered by any rider on the vehicle, and varying proportions of power may be provided by different riders. Further, a preferred dual recumbent vehicle is easy to assemble and disassemble into independently operatable bicycles, and is capable of being stored in an upright position in order to decrease the space required for such storage.

23 Claims, 8 Drawing Sheets

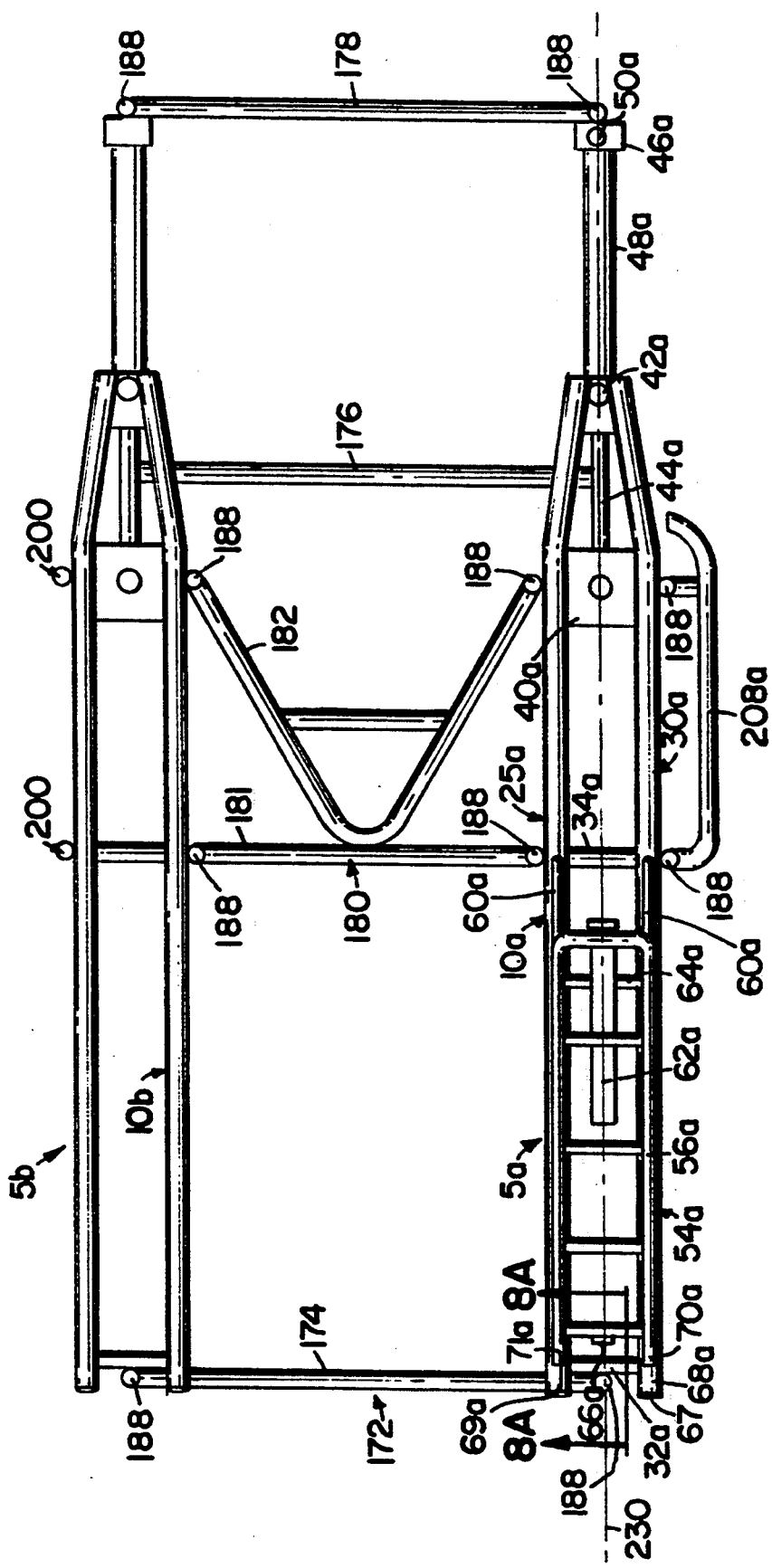

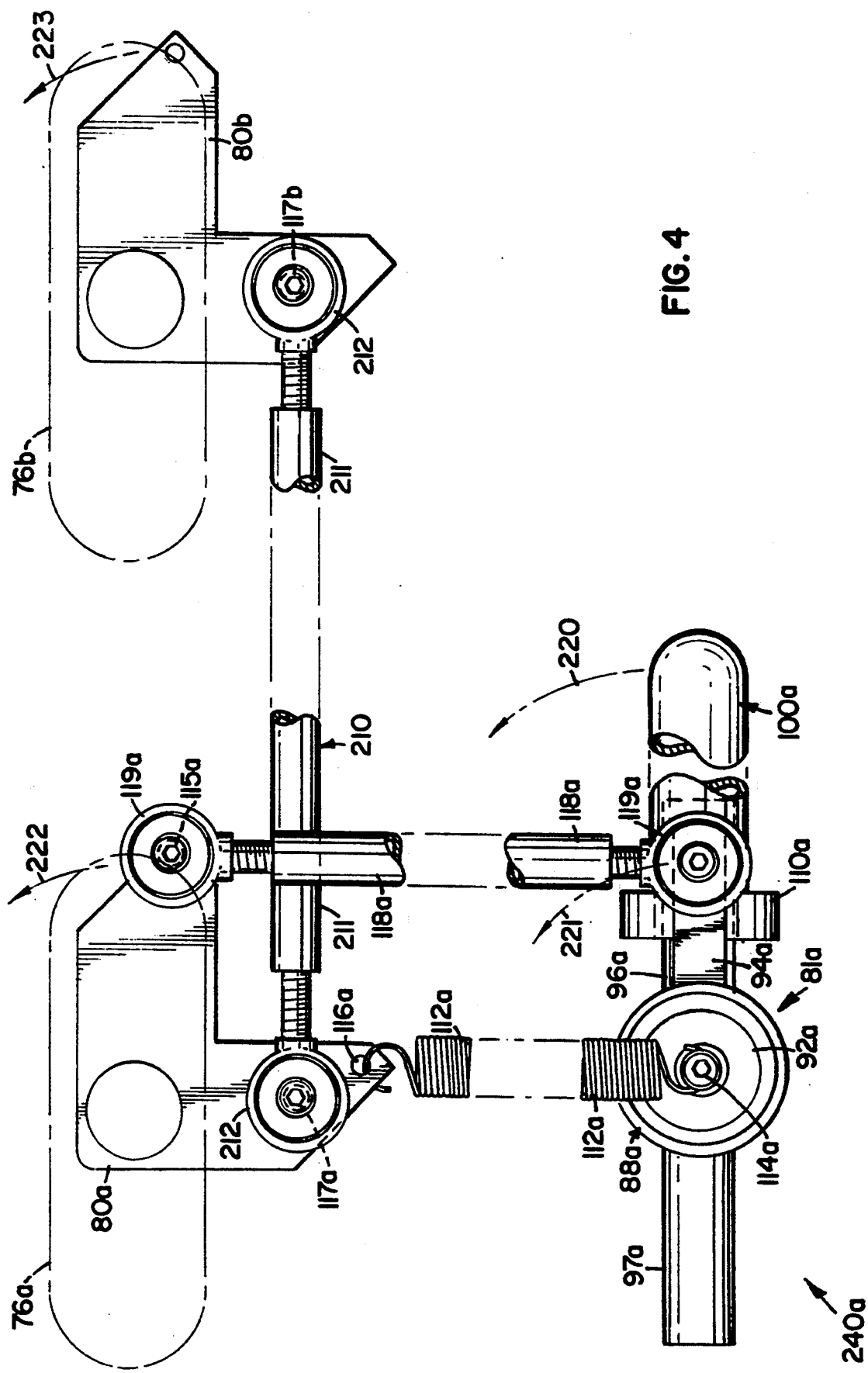

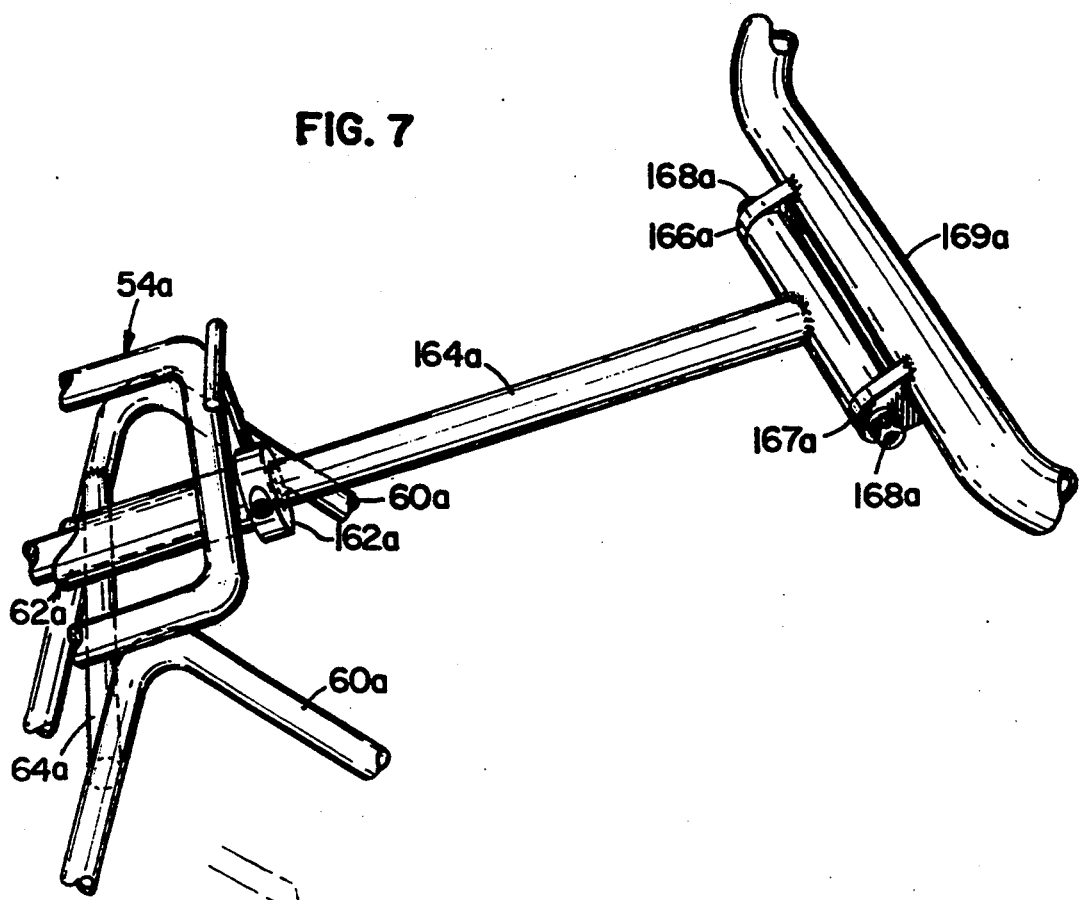
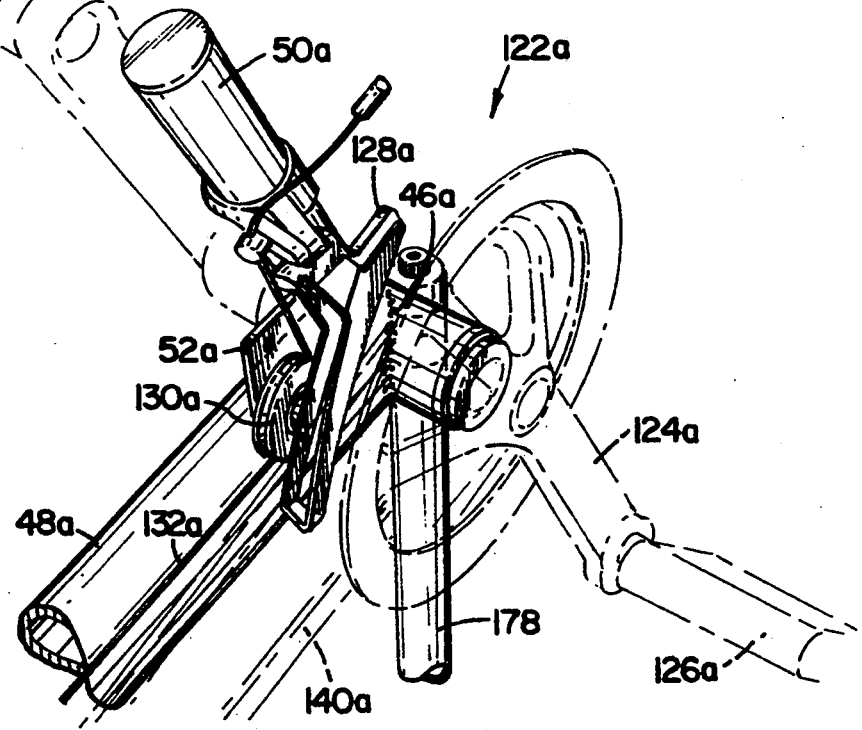

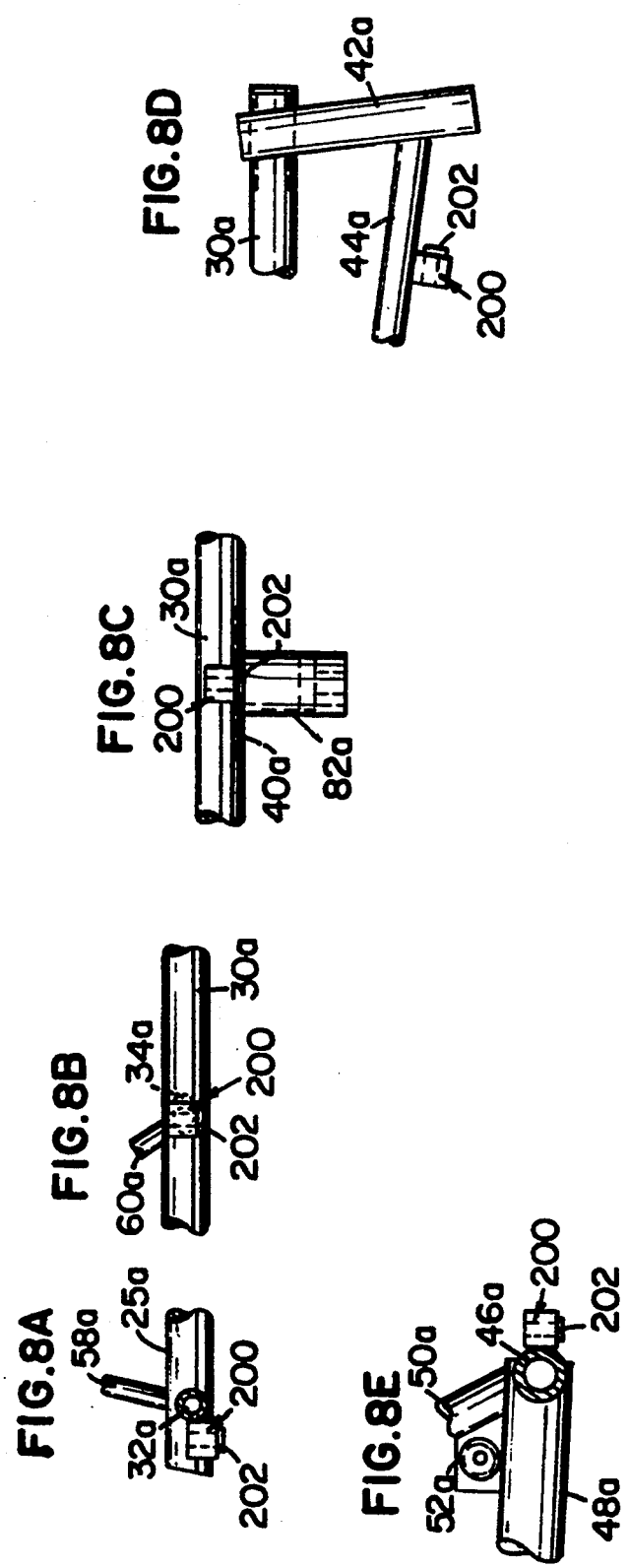

DUAL RECUMBENT VEHICLE

FIELD OF THE INVENTION

The invention is directed to bicycles and other rider-propelled vehicles, and more particularly, is directed to side-by-side rider-propelled vehicles capable of carrying more than one rider.

BACKGROUND OF THE INVENTION

Bicycles and other user-propelled vehicles are environmentally friendly methods of transportation. As concerns grow over pollution, traffic congestion, and other complaints commonly voiced about automobiles and other motorized modes of transportation, alternative forms of transportation which do not pollute or add to traffic congestion have become more and more popular. Such user-propelled vehicles are also an excellent form of exercise. They are typically excellent for aerobic and strengthening exercises.

Often it is desirable for a vehicle to be capable of carrying more than one person. This may be preferable when companionship is desired during exercise, for example, or when a child or disabled person is involved. One such vehicle is known commonly as a tandem bicycle. In this vehicle, one rider sits in front of another rider, with each having pedals for providing power, and the front user being provided with a handlebar to steer the vehicle. However, there are several drawbacks associated with tandem bicycles.

First, the drive assemblies on tandem bicycles are typically interconnected such that the pedals for each rider turn in unison. Therefore, both riders must typically pedal together, and neither rider can rest his or her feet on the pedals without them turning whenever the other rider is pedalling. Also, when one rider is in better physical condition than the other, that person will typically bear most of the load, and the other may not receive enough exercise.

Another problem associated with tandem bicycles is that only the forward rider is capable of steering the vehicle. In order for the other rider to be able to steer the vehicle, the riders would have to stop and exchange places. During long trips, it may be desirable to take turns at steering the vehicle. This cannot be performed without first stopping the vehicle and exchanging riders.

Another problem associated with tandem bicycles is that they must be balanced while riding. While all bicycles require a rider to remain balanced, a tandem bicycle complicates balancing because two independent riders must coordinate their movements in order to keep the vehicle balanced. It may be preferable in some instances to have a vehicle that is more stable and does not require riders to pay constant attention to their balance.

In order to provide better balance and stability, as well as provide separate drive assemblies, upright side-by-side bicycles have been constructed. These vehicles are often two standard upright bicycles which have been secured together side-by-side by a number of cross-braces interconnected therebetween, in order to provide a complete 4-wheeled vehicle. As these vehicles have four points of contact with the road, they are inherently better balanced, and less attention needs to be given to balancing by the riders. Also, as the two bicycles usually have independent drive assemblies, the pedals on each bicycle do not need to turn at precisely the same rate. Therefore, different amounts of power can be provided by each of the riders.

A number of drawbacks exist, however, in these upright side-by-side vehicles. First, while the balance and stability of these vehicles is much greater than a bicycle, the center of gravity for these vehicles is rather high since the riders sit upright. Therefore, greater stresses are placed on the cross-bracing and the vehicle may be prone to tipping over. Also, some of the upright side-by-side bicycles do not couple the steering systems for each of the independent bikes. Therefore, instead of only one rider being able to control the steering, both riders must pay attention to steering in order for the vehicle to operate safely. Some of the upright side-by-side bikes do use tie-rods or other coupling mechanisms in order to tie the handlebars together so that either rider can steer both bicycles when they are joined as a unit.

Another problem with upright side-by-side vehicles is that the connections between the bicycles are either permanent or very difficult to assemble and disassemble. Thus, when the two bikes are tied together, it is not easy to separate them so that each bike can be used independently. Another difficulty found with these upright side-by-side vehicles is that, once assembled, these vehicles are quite large and bulky, and take a significant amount of space to store.

Therefore, a need exists in the art for a vehicle capable of carrying two or more riders, which is stable and balanced, allowing for riders of different physical abilities, and allowing either rider to safely steer the vehicle. Further, there exists a need in the art for a side-by-side vehicle which is easy to assemble and disassemble, and which is easy to store.

There also exist in the art a number of different seating configurations in user-propelled vehicles which provide advantages over the typical upright position which is found in most bicycles. One such seating configuration is the recumbent seat. This configuration enables a rider to sit in a relaxed reclined position with support for the back, reducing lower neck and back strain, as well as general arm and leg fatigue. Such recumbent seating configurations are found in recumbent bicycles useful for one operator. Many of such recumbent bicycles, however, are difficult to steer, as the handlebars are typically placed underneath the seat, so that a rider has to reach under both sides of the seat in order to steer the vehicle. Other recumbent vehicles implement overhead handlebars which extend upward and outward from the fork, similar to many upright bicycles. These handlebars, however, can reduce visibility and interfere with the knees or legs of a rider, while being generally awkward to control. Therefore, a need also exists in the art for a recumbent bicycle configuration having a steering assembly which allows a rider greater control over steering the vehicle, while providing ample visibility and relatively unrestricted body movement.

SUMMARY OF THE INVENTION

The present invention addresses these and other problems in the prior art in providing a dual recumbent vehicle having a pair of recumbent bicycles interconnected in a side-by-side relationship. By coupling the steering assemblies on each bicycle and by providing independent drive assemblies, the present invention enables a rider on either bicycle to steer the vehicle and to provide a varying proportion of the power to the vehicle.

In accordance with the present invention, there is provided a dual recumbent vehicle having a pair of recumbent bicycles and a means for interconnecting the pair of bicycles in a side-by-side relationship. Each of the recumbent bicycles has an operator-controlled steering assembly, an operator-controlled drive assembly, and a recumbent seat operatively connected to a frame structure. Further, the means for interconnecting the pair of bicycles has a cross-bracing means for operatively connecting the pair of bicycles in a side-by-side relationship, and a steering coupling means for coupling the steering assemblies of the bicycles such that they operate in unison.

In a further embodiment of the invention, each bicycle in the pair of recumbent bicycles includes a frame structure, a fork rotatably mounted thereon, a front bicycle wheel rotatably mounted to the fork, a rear bicycle wheel rotatably mounted to the frame, an operator controlled steer mechanism, a tie-rod operatively connected between the fork and the steer mechanism, a pedal assembly rotatably mounted to the frame, a free wheel assembly operatively connected to the rear bicycle wheel, a chain operatively connected between the pedal assembly and the free wheel assembly, and a recumbent seat slidably mounted on the frame. Further, the frame has a fork housing, a pair of parallel tubes extending from the fork housing toward the rear end of the bicycle, each with a rear mounting bracket for rotatably mounting a bicycle wheel, at least one cross-brace connected between the parallel tubes, a steer mechanism mounting plate connected between the parallel tubes, a steer mechanism fixed member mounted to the steer mechanism mounting plate, a front frame support connected between the fixed member and the fork housing, a pedal assembly housing proximate the forward the end of the bicycle, a bottom tube connected between the fork housing and the pedal assembly housing, and a derailer mount connected to the pedal assembly.

Dual recumbent vehicles consistent with the present invention are capable of accommodating two or more riders in a stable and balanced configuration which does not require cooperative balancing by the riders of the vehicle. Further, riders of different physical abilities may be accommodated, as varying proportions of power may be provided to such vehicles by each rider. Also, all riders of such vehicles are capable of steering the vehicles.

In a preferred embodiment of the present invention, the recumbent bicycles are easily assembled and disassembled to one another in order to enable a rider to quickly and easily join the pair of bicycles to operate them in unison or to disconnect the bicycles so that they may be used independently.

In another preferred embodiment of the present invention, the vehicle is provided with means for supporting the vehicle in a vertical position. This feature is useful for storage or maintenance, and so that a reduced amount of space is necessary to store the vehicle.

In a further preferred embodiment of the present invention, one or more vertical-type handlebars are provided in order to control the steering of the dual recumbent vehicle. These handlebars are preferably conveniently located and easily operatable by a rider.

In another preferred embodiment, different sizes of riders may be accommodated by adjusting the position of the recumbent seats and the handlebars. Further, each seat and handlebar may preferably be adjusted in more than one direction.

These and other advantages and features, which characterize the invention are pointed out with particularity in the claims annexed hereto and forming a part hereof. However, for a better understanding of the invention, its advantages and objectives obtained by its use, references should be made to the drawings which form a further part hereof and to the accompanying descriptive matter, in which there is described a preferred embodiment of the invention.

BRIEF DESCRIPTION OF THE FIGURES

FIG. 2 is a top plan view of the bicycle frames and brace members for the dual recumbent vehicle shown in FIG. 1A.

FIG. 4 is an enlarged fragmentary bottom plan view of just a preferred steering assembly and steering coupling mechanism consistent with the invention, showing the preferred steer mechanism and handlebar configuration in FIG. 3.

FIG. 5 is an enlarged fragmentary perspective view of a preferred pedal assembly consistent with the invention.

FIG. 7 is an enlarged fragmentary perspective view of a preferred seatback mounting assembly consistent with the invention.

FIG. 8A is a side cross-sectional view of a preferred connecting member mounting configuration for connecting with a rear brace, taken along line 8A—8A of FIG. 2.

FIGS. 8B and 8C are side elevational views of preferred connecting member mounting configurations for connecting with a stabilizer member.

FIG. 8D is a side elevational view of a preferred connecting member mounting configuration for connecting with a middle brace.

FIG. 8E is a side elevational view of a preferred connecting member mounting configuration for connecting with a forward brace.

DETAILED DESCRIPTION OF THE PREFERRED EMBODIMENT

Figure 1A:
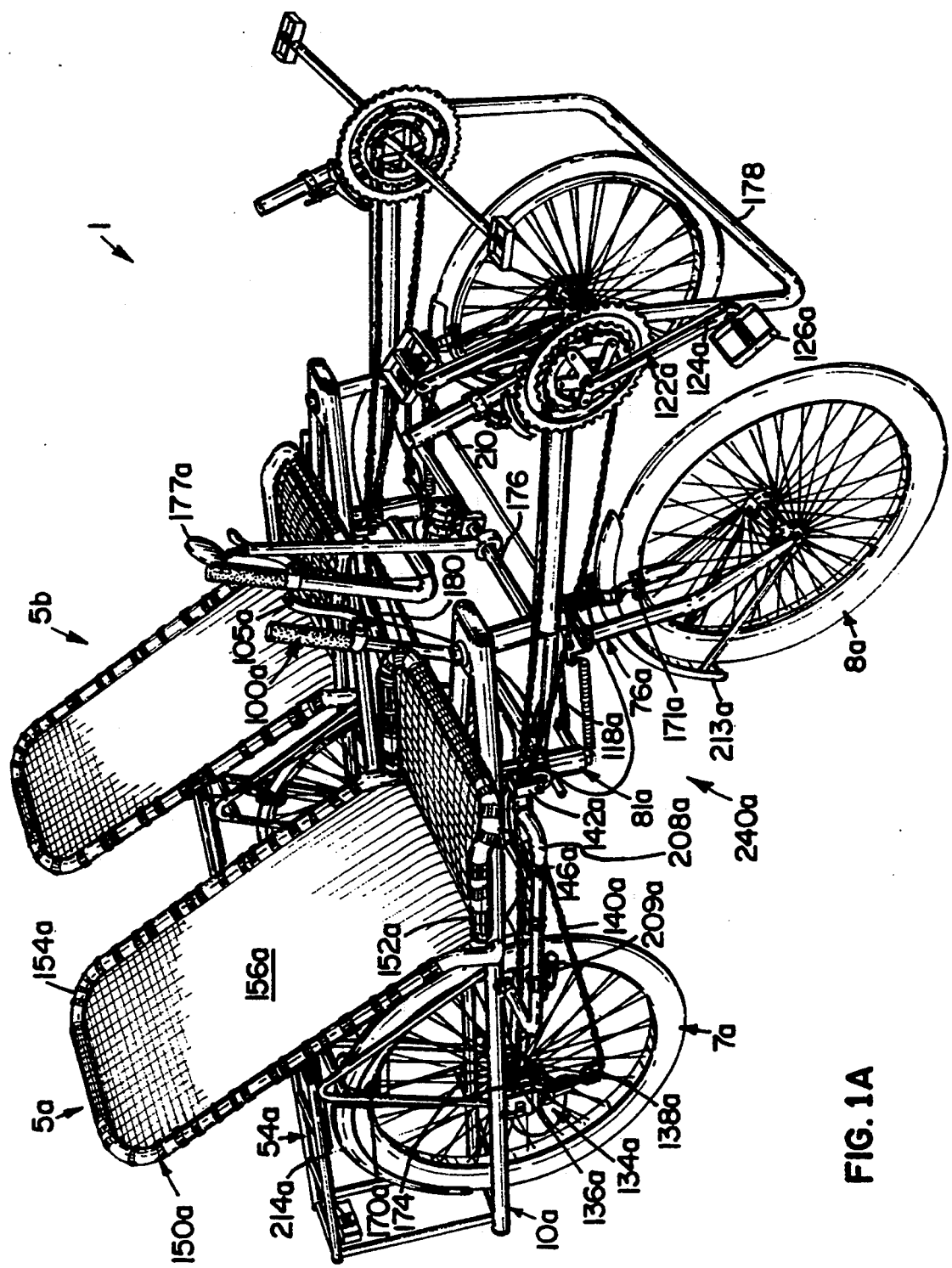
FIG. 1A is a perspective view of a preferred dual recumbent vehicle consistent with the invention.
Figure 1B:
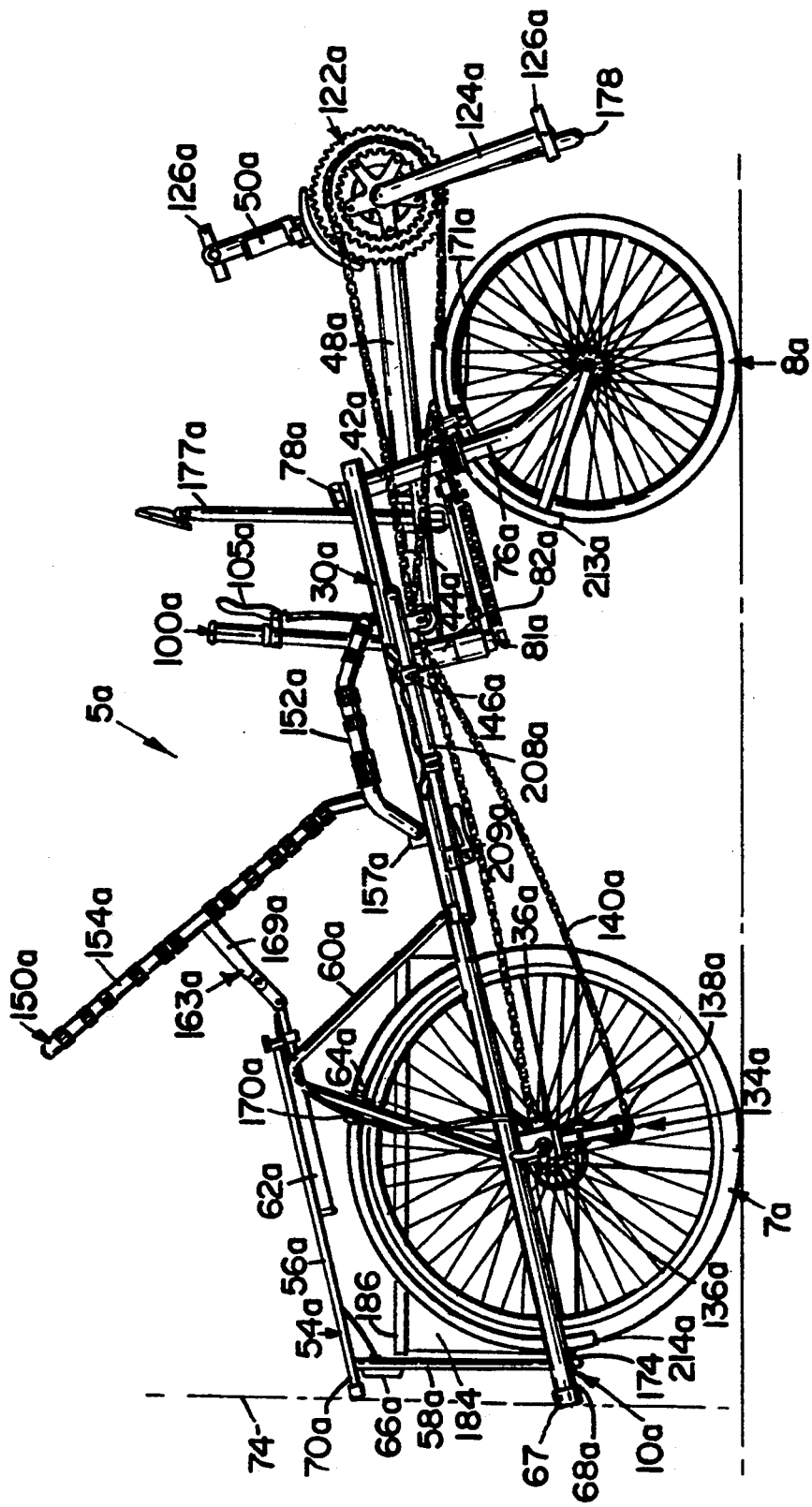
FIG. 1B is a side elevational view of the dual recumbent vehicle shown in FIG. 1A.

In the drawings wherein like parts are designated with like numerals throughout the several views, there can be seen a preferred dual recumbent vehicle 1 shown in FIGS. 1A and 1B. Preferred vehicle 1 includes a pair of recumbent bicycles 5a and 5b interconnected in a side-by-side relationship by a number of cross-bracing members 174, 176, 178 and 180, and a steering coupler mechanism 210 for integrating the steering assemblies of the bicycles so they operate in unison.

Bicycles 5a and 5b are preferably each capable of being operated independently whenever they are not interconnected by brace members 174, 176, 178 and 180, and their steering assemblies joined by steering coupler 210. Further, each bicycle is preferably manufactured identically to the other bicycle. As seen in FIG. 1A, the only difference between bicycles 5a and 5b is the placement of the handlebars, such as handlebar 100a, and the placement of the grab rails, such as grab rail 208a. As will be discussed in greater detail later, the handlebars and the grab rails may be secured on either side of the bicycles. Therefore, as shown in FIG. 1A, it is preferable that the handlebars for both bicycles be located between the bicycles when interconnected, and that the grab rails be located along the outer side of the bicycles when they are interconnected.

As bicycles 5a and 5b are essentially identical, discussion hereinafter will be limited to the construction of bicycle 5a, and all components on bicycle 5a will be denoted with an "a". One skilled in the art will appreciate that the components discussed in relation to bicycle 5a would similarly be found on bicycle 5b.

Hereinafter, the "forward" direction relates to the direction which the bicycle travels when in operation (generally in the direction from the rear to the front wheel) and the "rear" direction is the opposite direction thereto. The "left" side of a bicycle is with respect to the left side of a rider when seated in operating position, and the "right" side is with respect to the right side of the rider.

Generally, bicycle 5a includes a sturdy tubular frame 10a which provides the structural support for all the components of bicycle 5a. Frame 10a includes a rack 54a, which generally allows for carrying cargo. This rack 54a also provides support for dual recumbent vehicle 1 in a vertical position (with the front wheel above the rear wheel), as well as for providing mounts for a brake, a fender, and a tail light.

The steering assembly 240a for bicycle 5a includes a fork 76a which is rotatably mounted to frame 10a, a steer mechanism 81a which is operatively connected to fork 76a by tie-rod 118a, and handlebar 100a which is operatively connected to steering mechanism 81a. Fork 76a provides the mount for the front wheel 8a. The steering assembly 240a operates to enable a movement of the handlebar 100a to be transmitted to fork 76a.

Bicycle 5a also includes a drive assembly, which includes a pedal assembly 122a having crank 124a and pedals 126a. A rear wheel 7a is also connected to frame 10a, and a free wheel assembly 134a is operatively connected to this wheel. This free wheel assembly 134a includes free wheel hub 136a and derailer 138a. The pedal and free wheel assemblies are operatively connected by a chain 140a, which transmits the power provided by a user at the pedal assembly 122a to the rear wheel 7a. Gear selection is provided by gear shift mechanism 146a, mounted to grab rail 208a.

Bicycle 5a has a recumbent-type seat 150a. This seat 150a includes a base 152a, and a back rest 154a. Further, a mesh insert 156a is mounted to seat base 152a and back rest 154a, and it provides a comfortable surface for supporting a rider.

As can best be seen in FIG. 1B, recumbent seat 150a is slidable along the length of frame 10a for accommodating different sizes of riders. The seat base 152a is secured to frame 10a by seat mounting assembly 157a. The back rest 154a is connected to a guide tube 62a on rack 54a by a seatback mounting assembly 163a. Both of these mounting assemblies have quick-release mechanisms to enable quick and easy adjustment of recumbent seat 150a.

Bicycle 5a also includes a rear brake 170a and a forward brake 171a. Control for these hand brakes is preferably provided by control 105a mounted to vertical handlebar 100a, and control 209a mounted to grab rail 208a.

In order to form dual recumbent vehicle 1, bicycles 5a and 5b are interconnected by a number of cross-brace members. Brace member 174 is connected near the rear of bicycles 5a and 5b. Middle brace member 176 is connected to each of the bicycles near the middle of their frames, proximate the housings for the forks. This brace 176 also provides a convenient area for mounting accessories, such as rear view mirror 177a. Also, bicycles 5a and 5b are connected at their forward ends by brace member 178. This member 178, in addition to providing cross-bracing, also operates as a bumper, and as a handle for lifting vehicle 1 into a vertical position. Bicycles 5a and 5b are also connected by a stabilizer member 180, located generally between the recumbent seats on the frames of each bicycle to provide additional support. This stabilizer member 180 also provides a support for an optional storage compartment 184, having cover 186, which is preferably supported by stabilizer member 180 and rear brace member 174.

As can be best seen in FIG. 1A, the forks of each bicycle 5a and 5b are connected by steering coupling mechanism 210, which ensures that a rotation of either handlebar, such as handlebar 100a, will induce both bicycles to turn in unison.

As will be discussed in greater detail below, bicycles 5a and 5b preferably include identical brace connections on each side, to enable each bicycle to be connected at either side. The grab rail, such as grab rail 208a, is preferably provided opposite stabilizer member 180, and is secured by the corresponding opposite connections to those which secure stabilizer member 180. With these connections, bicycles 5a and 5b can be interconnected with either on the left or right side of dual recumbent vehicle 1.

A number of further advantages and features will become apparent as the preferred dual recumbent vehicle 1 is discussed in greater detail below.

BICYCLE FRAME

FIG. 2 shows a preferred frame 10a for bicycle 5a (see also FIG. 1B for a side elevation thereof). Frame 10a provides the primary structural support for bicycle 5a. All of the steering and drive components, as well as the front and rear wheels, are connected to frame 10a. Also, recumbent seat 150a is slidably mounted thereon. Further, as will be discussed later, frame 10a provides a structural support for the cross-bracing used to connect bicycle 5a to bicycle 5b in dual recumbent vehicle 1.

Frame 10b of bicycle 5b is also shown, in part, in FIG. 2. The rack for this frame is cut away. Also shown are the cross-bracing members 172, which will be discussed in greater detail later.

The preferred frame 10a is constructed of a sturdy tubing such as 4130 chrome-moly straight gauge tubing. One skilled in the art will recognize, however, that any of a number of commonly used bicycle frame materials may be used, such as other metals, or graphite or other composite materials, which provide light weight and structural strength.

The components which make up frame 10a are preferably welded together using commonly-known weld techniques. One skilled in the art will appreciate, however, that any number of alternative connections, such as bolts or rivets, could be used in the alternative. However, for strength, appearance, and ease of manufacture, it has been found that welding is a preferred connection method.

Frame 10a is also preferably painted using a commonly-known paint such as an enamel-based paint. Painting the frame and other components of bicycle 5a improves the appearance and prevents rusting of metal components in bicycle 5a.

Frame 10a is preferably substantially symmetrical along mean plane 230, in order for it to be usable as either a left or right bicycle in dual recumbent vehicle 1. Frame 10a is preferably a double parallel tube structure having parallel tubes 25a and 30a running generally all the way from the rear end of bicycle 5a to a fork housing 42a. It has been found that the double-tube structure is preferable because it provides exceptional structural support for bicycle 5a, as well as for the cross-bracing used to interconnect bicycles 5a and 5b. Using the double-tube structure, it is simple to provide identical connections on either side of bicycle 5a to enable it to be interconnected either as a left or a right bicycle in dual recumbent vehicle 1. It has also been found that the double-tube structure provides a sturdy support for mounting recumbent seat 150a, as the seat is supported at two positions across its width, rather than one as is found in most single-tube frame structures. The parallel tubes 25a and 30a are connected by a number of cross-braces, such as braces 32a and 34a. In addition, a steer mechanism mounting plate 40a is also connected between parallel tubes 25a and 30a. One skilled in the art will appreciate that more or less cross-bracing may be included depending upon the structural requirements of the frame. As can be seen in FIG. 2, tubes 25a and 30a converge between mounting plate 40a and fork housing 42a.

As seen in FIG. 1B, parallel tubes 25a and 30a also have standard rear wheel mounting brackets 36a mounted along their bottom sides, for holding rear wheel 7a. These mounting brackets 36a include a slotted aperture for rear wheel 7a, so that tension in a chain can be adjusted by securing rear wheel 7a at various points along the slot.

Rear wheel 7a, which is shown mounted to the frame in FIGS. 1A–1B, is preferably a 26 inch bicycle wheel with an alloy rim, such as manufactured by Sun, and a bicycle tire such as manufactured by Avocet. The preferred hub for rear wheel 7a is of the type manufactured by Shimano. One skilled in the art will appreciate that any of a number of sizes and manufacturers of commercially-available bicycle wheels may be used for rear wheel 7a.

Steer mechanism mounting plate 40a is used for mounting the steer mechanism along its bottom side. As seen in FIG. 1B, a fixed member 82a of steering mechanism 81a is welded along the bottom side of mounting bracket 40a. Fork housing 42a, which houses fork 76a, is of sufficient length and diameter to accept a commercially-available bicycle fork. One skilled in the art will appreciate, however, that this fork housing can be of any of a number of lengths and diameters to accommodate various fork designs.

Frame 10a also includes a front frame support 44a connected between the fork housing 42a and the fixed member 82a which is mounted to mounting plate 40a. This frame support 44a provides a second support in a second plane for fork housing 42a. This enables the weight which is placed on fork 76a to be more evenly distributed across frame 10a.

For housing a pedal assembly, frame 10a also includes a pedal assembly housing 46a which is of sufficient length and diameter to house any of a number of commercially-available crank/sprocket assemblies. This pedal assembly 46a is connected to fork housing 42a by bottom tube 48a, which is preferably along a parallel line to front frame support 44a.

Also, for the operation of a pedal assembly, pedal assembly housing 46a further includes a derailer mount tube 50a which extends upward from pedal assembly housing 46a. This derailer mount tube 50a provides a place to mount a front derailer. Also, a derailer pulley mount plate 52a is connected between derailer mount tube 50a and bottom tube 48a, for holding a pulley necessary for the operation of a front derailer, which will be discussed later.

Also affixed to frame 10a is a rack 54a. This rack provides additional structural support for bicycle 5a, as well as a place to store books or other cargo. It also provides an additional mounting point, guide tube 62a, for supporting recumbent seat 150a on frame 10a. This rack 54a also includes a place to mount a tail light and a place to mount a rear brake and a fender. Rack 54a further includes additional support necessary for the vertical storage feature of bicycle 5a.

Rack 54a is constructed of a top rack member 56a which includes a number of cross-braces for supporting books or other articles to be carried, as well as to strengthen rack 54a. Top rack member 56a also houses guide tube 62a which is used to provide a mounting point for recumbent seat 150a.

Top rack member 56a is supported towards the rear end of bicycle 5a by rear rack member 58a. This U-shaped member is connected at its free ends to both parallel tubes 25a and 30a, near cross-brace 32a. Rear rack member 58a also includes a tail light mount 66a centered thereon.

Top rack member 56a is also supported by a pair of side rack members 60a. Each side rack member is V-shaped, and is connected at each of its free ends to one of the parallel tubes 25a and 30a. Further, the side rack members 60a are connected at their vertices to top rack member 56a. It is preferable to affix one of the free ends on each of these side rack members 60a proximate to cross-brace member 34a and the other free ends proximate rear wheel mounting brackets 36a, to provide maximum structural support for frame 10a.

Rack 54a also includes a brake/fender mount 64a which is connected between the two side rack members 60a. This brake/fender mount enables a fender 214a and a rear brake 170a to be connected in proper orientation to the rear wheel.

Frame 10a is preferably constructed to enable bicycle 5a to be supported in a vertical position, that is, with its front wheel located above its rear wheel. This is preferably provided by configuring parallel tubes on members 25a and 30a and rack 54a such that, when tipped up, bicycle 5a is supported along a common plane (shown by line 74 in FIG. 1B) by tubes 25a and 30a and rack 54a. This vertical position greatly reduces the amount of space required to store bicycle 5a, and it can also be useful for performing maintenance or cleaning.

It is preferable that the ends 68a and 69a of parallel tubes or members 30a and 25a, respectively, and the ends 70a and 71a of top rack member 56a be constructed along plane 74. Plane 74 is selected such that, when bicycle 5a is operational with all of its components installed, the bicycle will be adequately balanced and supported at these points. Therefore, one consideration to be made in constructing rack 54a is to ensure that it is of sufficient height to provide enough spacing between top rack member 56a and parallel tubes 25a and 30a to provide an adequate "footprint" for stable support of bicycle 5a in the vertical position. Also, as will be discussed later, the ends should be configured to be able to support and balance bicycles 5a and 5b when they are interconnected to form dual recumbent vehicle 1.

One skilled in the art will appreciate that different rack/frame combinations could be used to provide the necessary support for the bicycle 5a in the vertical position. For instance, in a bicycle not having a rack, additional members could be affixed to the parallel tubes to provide additional support points. Also, the necessary support could be provided through only three support points. However, it has been found that the preferred construction of frame 10a provides adequate support to support bicycle 5a in the vertical position.

It is also preferred for the vertical support feature to include plastic feet (such as foot 67) on the ends of top rack member 56a and parallel tubes 25a and 30a. These plastic feet provide a non-slip surface to reduce the possibility of bicycle 5a falling over. One skilled in the art will appreciate that rubber or any other non-slip surface could also be used as feet in this circumstance.

While the preferred structure for frame 10a has been disclosed above, one of ordinary skill in the art will appreciate that a number of variations and modifications may be made to frame structure 10a without departing from the spirit and scope of the invention. Various bicycle frame designs are well known in the art, and a number of features present in these designs could be implemented into a frame structure suitable for use with the present invention. For example, the double parallel-tube structure could be modified to join into a single tube between the fork housing and the rear wheels, rather than remaining two separate tubes along the entire length. However, this design would result in less seat stability. In addition, it is also possible to construct a frame to house a fork forward of the pedal assembly housing, such that the front wheel is located in front of the pedal assembly. This type of configuration is typically referred to as a long-wheel base configuration.

STEERING ASSEMBLY

Bicycle 5a is steered by a steering assembly 240a which includes fork 76a, steer mechanism 81a, handlebar 100a and tie-rod 118a. Each of these components is shown generally in FIG. 1A. The steering assembly provides for the directional control of bicycle 5a. It is preferable that this steering assembly be configured to be easily and safely operatable by user, and that the handlebar be responsive and convenient for a user's needs.

Referring to FIG. 1B, the preferred fork 76a is shown. For 76a operates to rotate front wheel 8a in order to change the direction of bicycle 5a in operation. This fork is preferably a unicrown-type fork, which is commercially-available from Wald, for example. Such a fork may further be modified in order to obtain different steering dynamics for a vehicle. One skilled in the art will appreciate that a number of fork designs, which are either commercially-available or specially designed, could be used in bicycle 5a.

Fork 76a has two legs which are oppositely disposed such that a wheel may be mounted therebetween. In the preferred bicycle 5a, a 20 inch bicycle wheel is preferably used for front wheel 8a (shown in FIGS. 1A–1B). Like rear wheel 7a, it is preferable that an alloy rim be used, such as manufactured by Sun. Further, a 20 inch bicycle tire, such as manufactured by Kenda is used. Front wheel 8a is rotatably joined to fork 76a by a commercially-available hub such as is manufactured by Shimano. One skilled in the art will appreciate that alternatively any number of other commercially-available bicycle wheel assemblies may be used with bicycle 5a.

Fork 76a is connected to frame 10a at the fork housing 42a. Fork 76a has a shaft (not shown) which extends through fork housing 42a. Preferably, a pair of bearings are located within fork housing 42a to enable fork 76a to rotate within the housing. An end cap 78a is provided in order to keep fork 76a within housing 42a. The components and construction of this rotatable mount is well-known in the art.

In some instances, it may be preferable to construct fork 76a such that it is easily removable and installable on frame 10a. Such a feature may be preferable for removing the fork during shipping, for instance, to reduce the overall size of bicycle 5a.

Fork 76a also has a mount for a fender 213a and a front hand brake 171a (seen, for instance, in FIG. 1A). Such connections are also well known within the art, and are common on most commercially-available forks.

Referring to FIG. 4, fork 76a also has a fork steer coupler 80a, which is a plate located near the bottom of fork housing 42a when fork 76a is mounted therein. Fork 76a is shown in phantom. This fork steer coupler rotates with fork 76a along the same axis, and is connected to steer mechanism 81a in order to enable steer mechanism 81a to control fork 76a. It is preferable that fork steer coupler 80a include a connection 115a for a tie-rod 118a which is connected to steer mechanism 81a, and a connection 117a for the tie-rod 211 of the steering coupling mechanism 212 which interconnects bicycles 5a and 5b in order to provide integrated steering for dual recumbent vehicle 1. It is also preferable for fork steer coupler to include a connection 116a for a spring 112a which operates as a self-centering device for the steering assembly of bicycle 5a.

While this coupler 80a is shown as a being generally L-shaped, (i.e., having two transversely extending portions joined at a vertex) one of ordinary skill in the art will appreciate that a number of sizes and shapes may be used for this member, such as a generally triangular shape. One of ordinary skill will also appreciate that, for instance, tie-rod 118a could be connected on either side of to fork 76a, and that tie-rod 211 could be interconnected with bicycle 5b towards the front or rear of fork 76a. What is necessary for the proper operation of this steering assembly is that the connections for both of these tie-rods be found at a distance from the axis of rotation of fork 76a, such that the tie-rods connected thereto will encounter an arcuate path whenever fork 76a is turned.

Figure 3:
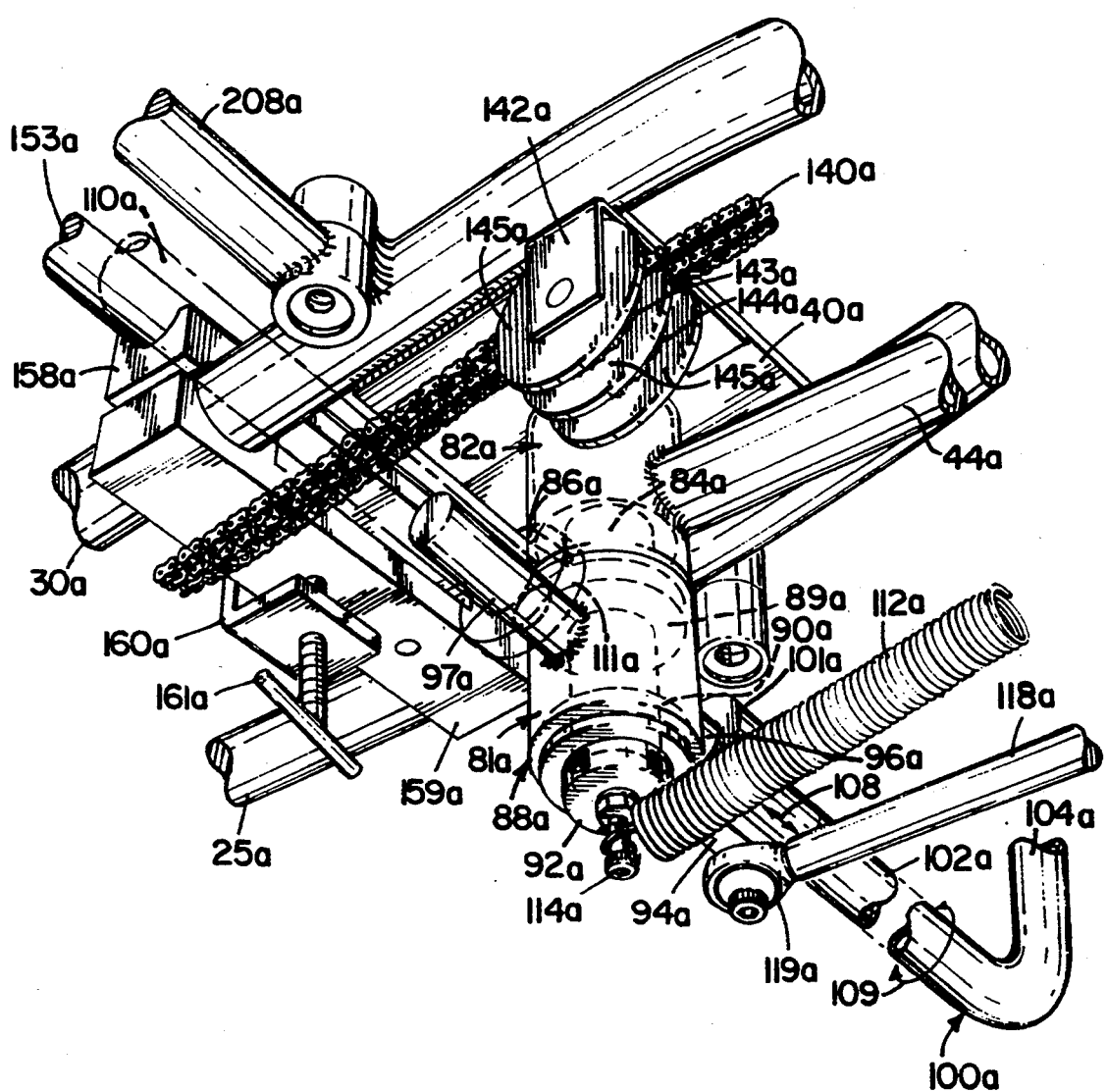
FIG. 3 is an enlarged fragmentary bottom perspective view of a preferred chain support, steer mechanism and handlebar configuration consistent with the invention.

FIG. 3 shows steer mechanism 81a, which is mounted to mounting plate 40a on frame 10a. This steer mechanism 81a operates to rotate whenever force is applied to a handlebar, and to transmit this rotation to fork 76a for controlling the direction of bicycle 5a.

Steer mechanism 81a includes a fixed member 82a which is preferably welded directly to mounting bracket 40a, and which supports front frame support 44a. One skilled in the art will appreciate that this member could also be affixed by bolts or other commonly-known fastening methods. Steer mechanism 81a is configured such that a rotatable member 88a will rotate about fixed member 82a. Fixed member 82a is provided with a steering shaft 84a which is mounted inside a receiving recess within fixed member 82a, and is secured by a roll pin 86a. One of ordinary skill in the art will appreciate that this steering shaft could be mounted by a number of fastening systems known in the art, or could be integral with the portion of fixed member 82a which is welded to mounting bracket 40a.

Rotatable member 88a has an aperture defined throughout which accepts steering shaft 84a. Further, rotatable member 88a has a pair of larger recesses in its top and bottom sides to receive bearings 89a and 90a, which enable rotatable member 88a to rotate about steering shaft 84a. Any commercially-available bearing system may be used to connect rotatable member 88a to fixed member 82a. Rotatable member 88a is secured to steering shaft 84a by clamp collar 92a, which is affixed to steering shaft 84a below rotatable member 88a. Thus configured, rotatable member 88a is secured to fixed member 82a, and is able to rotate about steering shaft 84a. One of ordinary skill in the art will appreciate that other methods of rotatably connecting one member to another may be used for steer mechanism 81a.

In order to control fork 76a, rotatable member 88a includes a steer extension 94a which extends outwardly from rotatable member 88a perpendicular to steering shaft 84a. Whenever rotatable member 88a rotates, the end of steer extension 94a moves in an arcuate motion similar to fork steer coupler 80a. Further, steer extension 94a includes an aperture or other connection for connecting tie-rod 118a thereto. As seen in FIG. 4, steer extension 94a is connected to fork steer coupler 80a through tie-rod 118a. Thus configured, any rotation of rotatable member 88a will be transferred to fork 76a.

Tie-rod 118a operates to transfer a rotation of steer mechanism 81a to fork 76a. Tie-rod 118a preferably has a pair of tie-rod ends 119a connected at each of its ends for connection to steer extension 94a and fork steer coupler 80a. These tie-rod ends are preferably spherical tie-rod ends, such as manufactured by Aurora Bearing. They enable tie-rod 118a to rotate, and they also enable the length of tie-rod 118a to be varied in order to properly align rotatable member 88a and fork 76a. Further, tie-rod 118a is preferably threaded so that this alignment can be made by threading either of tie-rod ends 119a a variable amount to adjust alignment.

Returning to FIG. 3, rotatable member 88a also includes a pair of handlebar connection pegs 96a and 97a, which extend outwardly from rotatable member 88a perpendicular to steering shaft 84a. (In FIG. 1A, only one peg is shown for a configuration implementing only one handlebar per bicycle). These pegs 96a and 97a provide connections for handlebars which control the operation of steer mechanism 81a. As seen in FIG. 3, handlebar connection pegs 96a and 97a are welded to opposite sides of rotatable member 88a. One skilled in the art will appreciate that a number of alternative connections for handlebar connection pegs 96a and 97a to rotatable member 88a may be made. For instance, pegs 96a and 97a could be located upon opposing sides of a single clamp collar which is mounted around rotatable member 88a, or could each be welded to separate clamp collars mounted to rotatable member 88a.

While it is preferable that pegs 96a and 97a be oppositely disposed on rotatable member 88a, one skilled in the art will appreciate that their relative orientation could vary, or that only one peg could be used in instances where only one handlebar is desired. However, two pegs are preferred because one peg would not enable the position of a handlebar to be switched from side to side depending on user preference, or when bicycle 5a is connected on different sides to bicycle 5b in dual recumbent vehicle 1.

A number of different handlebar configurations can be implemented for bicycle 5a. In the preferred bicycle 5a, a vertical handlebar 100a, and a horizontal handlebar 110a, are provided for controlling bicycle 5a. As seen in FIG. 1A, it is preferred for vertical handlebar 100a to be located on bicycle 5a such that, when the bicycle is interconnected to bicycle 5b, the vertical handlebar 100a is disposed therebetween. Also, in such a configuration, the horizontal handlebar 110a (not shown in FIG. 1A) is preferably configured on the outside of bicycle 5a, underneath grab rail 208a (shown in FIG. 3). For bicycle 5b, it is preferable that these connections be reversed, as shown in FIG. 1A. However, since bicycle 5a is interchangeable with bicycle 5b, in some instances it may also be desired to reverse the configuration of the vertical and horizontal handlebars. Depending upon user preference, steer mechanism 81a enables a wide variety of additional handlebar combinations to be used for bicycle 5a. For instance, a single vertical or horizontal handlebar could be provided on either side of bicycle 5a. Also, a pair of vertical handlebars, or a pair of horizontal handlebars, could be implemented in the alternative.

In order to provide this wide variety of handlebar combinations, it is preferable that the connection between a handlebar and rotatable member 88a of steer mechanism 81a be easy to connect and disconnect. In the preferred configuration, a handlebar is provided with a clamp collar welded at its end, which enables handlebar mounting peg 96a or 97a to be inserted and secured therein. For instance, as shown in FIG. 3, vertical handlebar 100a includes a first portion 102a which is disposed generally perpendicular to the rotational axis of rotatable member 88a. Vertical handlebar 100a also includes a second portion 104a which is perpendicular to the first portion 102a, and which is oriented such that it projects upward to a convenient place for use by a rider of bicycle 5a. The first portion 102a of vertical handlebar 100a is of sufficient diameter to enable a handlebar connection peg to slide within. This first portion 102a also includes a clamp collar 101a which is affixed at its end. Thus, whenever the first portion 102a of handlebar 100a is slid onto handlebar connection peg 96a or 97a, it may be secured to rotatable member 88a by tightening clamp collar 101a. Similarly, for horizontal handlebar 110a, a clamp collar 111a is provided at its end, so that whenever the horizontal handlebar is slid over either peg 96a or 97a, it may be secured to rotatable member 88a by tightening clamp collar 111a.

The configuration of the steer mechanism 81a shown in FIG. 3 enables handlebars 100a and 110a to be easily adjusted according to user preference. By affixing these handlebars by clamp collars onto connection pegs, adjustment is available in two directions.

The first adjustment which is allowed is adjusting for the width, or distance from the handlebar and the mean plane of frame 10a (shown as line 230 in FIG. 2), in the direction shown by arrow 108 in FIG. 3. By loosening clamp collar 101a on vertical handlebar 100a, first portion 102a is capable of sliding along handlebar connection peg 96a, and can be secured at any point thereon by clamp collar 101a. Similarly, horizontal handlebar 110a maybe lengthened or shortened by loosening clamp collar 111a and sliding handlebar 110a along handlebar connection peg 97a.

A second adjustment is also controlled by loosening clamp collar 101a on handlebar 100a. In addition to sliding up and down handlebar connection peg 96a, the first portion 102a of handlebar 100a is capable of rotating relative to handlebar connection peg 96a, in the direction shown by arrow 109. This adjustment is especially useful for vertical handlebars such as handlebar 100a, since the distance between a rider and second portion 104a can be varied to accommodate different arm lengths. Essentially, this adjustment allows the second portion 104a of handlebar 100a to adjust towards the forward or rear end of bicycle 5a. While in some instances this particular adjustment may not be useful for horizontal handlebar 110a if it is a perfectly straight tube, in some instances it may be preferable to include some sort of bend or alternative configuration for horizontal handlebar 110a such that a rotational adjustment would be useful. For instance, if a horizontal handlebar incorporated an L-shape, with a second portion extending back towards the rear end of bicycle 5, such as rotational adjustment could be useful.

A third form of adjustment is also provided in alternative embodiment of rotatable member 88a, where handlebar connection pegs 96a and 97a, instead of being welded to rotatable member 88a or to a clamp collar, are slidable into apertures in the walls of rotatable member 88a. Clamp collars oriented with apertures for receiving the pegs would be required to secure these pegs to rotatable member 88a. This would provide an additional adjustment in the direction of arrow 108.

A preferred handlebar for connecting to rotatable member 88a preferably includes some form of grip, such as grip 106a (shown in FIG. 1A). Such a grip is preferably ergonomically designed such that a secure and comfortable grip may be provided to a rider. Also, as shown in FIG. 1A, it is preferable that a hand brake control 105a for controlling front brake 171a (or alternatively rear brake 170a) be mounted to vertical handlebar 100a. It is also preferable to place a grip on horizontal handlebar 110a, and in some instances it may be preferable to include a hand brake controller thereon.

Referring to FIG. 4, it can be seen that it is also preferable to provide some form of centering mechanism to induce fork 76a to a centered position. This is provided by spring 112a which is connected between connection aperture 116a on fork steer coupler 80a and connection 114a which is located on steering shaft 84a on steer mechanism 81a. Connection 114a (seen also in FIG. 3) is preferably an allen head socket screw, although any alternative peg or other fastening member known in the art could be used.

Spring 112a operates to center fork 76a because the steering assembly is preferably configured such that when fork 76a is in its central position, the distance between connection 114a and aperture 116a is at its minimum. Therefore, whenever fork 76a is turned in either direction, this distance increases, and spring 112a is stretched. When no force is being applied to the handlebars of bicycle 5a, this tension in the spring tends to pull fork 76a, and consequently rotatable member 88a, to a centered position. Any other tension producing member other than a spring would also be suitable in such circumstances.

In some instances it may further be preferable to include a damping mechanism between fork steer coupler 80a and steer mechanism 81a. Such a damping device (not shown) could be a shock absorber or other oscillation-damping device. It would operate to reduce the oscillation caused by spring 112a when fork 76a is released to its center position from a turned position. Such a damping device may also by useful in order to create a tighter feel to the steering assembly by creating greater resistance in the handlebars.

As can be seen in FIG. 4, in operation, a rotation induced on handlebar 100a in the direction of arrow 220 induces the rotation of rotatable member 88a, and in turn induces a rotation of steer extension 94a in the direction of arrow 221. The linkage provided by tie-rod 118a then transfers this rotation to fork steer coupler 80a and fork 76a in the direction of arrow 222.

Other alternative steering assemblies may be used which do not depart form the spirit and scope of the invention. For instance, steer mechanism 81a could instead be used to drive a rear fork in order to control the direction of a rear wheel. Similarly, steer mechanism 81a could be used to enable both the front fork and a rear fork to be controlled simultaneously. Further, gear assemblies could be incorporated in the steering assembly in order to increase or reduce the sensitivity of a fork to rotation in the handlebar. Another variation could be provided by slidably fastening mounting plate 40a to the parallel-tube structure, so that steer mechanism 81a could be positioned at various points along the length of the parallel-tube frame structure. Such an embodiment would require tie-rod 118a to be adjustable between a variety of lengths and would also require a different configuration for front frame support 44a; however, it would enable another form handlebar adjustment.

DRIVE ASSEMBLY

The drive assembly for bicycle 5a operates to enable a rider to propel bicycle 5a. It is preferable that such a drive assembly have a free wheel so that the driven wheel is able to rotate without a corresponding rotation in the pedals. It is also preferably to include multiple gears to enable bicycle 5a to be geared differently for different users and riding conditions. Further, it is preferable that the drive assembly of bicycle 5a not be coupled to the drive assembly of bicycle 5b. This enables users of different physical capability to independently select the amount of effort they wish to provide, and to enable one rider to rest while the other propels dual recumbent vehicle 1. The preferred drive assembly includes pedal assembly 122a, free wheel assembly 134a, chain 140a, and gear shift mechanism 146a, as seen in FIG. 1A.

Pedal assembly 122a, which is shown in greater detail in FIG. 5, is mounted in pedal assembly housing 46a. Pedal assembly 122a includes a crank/sprocket assembly 124a which is rotatably mounted in pedal assembly housing 46a. Preferably, the crank/sprocket assembly used is a three-speed assembly, such as a Shimano 26-36-46 crank. A pair of bearings secure this crank inside pedal assembly housing 46a. As this is a commercially-available product, its connection to pedal assembly housing 46a is well known within the art. Pedals 126a which are connected to crank/sprocket assembly 124a are preferably a low fat type.

Pedal assembly 122a also includes a front derailer 128a, which is preferably a Shimano DX front derailer. This derailer is mounted in a conventional manner to derailer mount 50a. Control for this derailer is provided by gear selection line 132a which is connected to gear shift mechanism 146a on grab bar 208a. In order to properly align line 132a for controlling derailer 128a, a pulley 130a is preferred mounted to derailer pulley mount plate 52a, so that line 132a will be deflected upward to detailer 128a.

Various alternative pedal assemblies may be used in lieu of pedal assembly 122a. A wide variety of crank/sprocket assemblies, pedals, and derailers are commercially available. Further, while the preferred crank/sprocket assembly 124a has three separate gears, any number of gears, such as one or two gears, could be used. Further, if one gear was used, derailer 128a could be omitted. Also, it may be preferable in some instances to provide a guard over the sprocket in crank/sprocket assembly 124a in order to protect the rider from grease or to protect dirt from getting into the chain.

As seen in FIGS. 1A and 1B, free wheel assembly 134a includes a free wheel and sprocket assembly 136a and a rear detailer 138a. The preferred free wheel is a Shimano Hyper Glyde free wheel, and the preferred sprocket is a Shimano 13-23 7-speed cassette sprocket. Further, the preferred detailer is a Shimano DX rear derailer. This derailer is controlled by a line (not shown) which is connected to gear shift mechanism 146a.

Various alternative free wheel assemblies could be used in lieu of assembly 134a. As a number of these assemblies are commercially-available, their construction, installation, and operation are all well-known within the art. Many brands of free wheels, sprockets, and detailers are available in the industry. In addition, one skilled in the art will appreciate that many alternative assemblies could be used. For instance, free wheel assembly 134a, instead of being operatively connected to rear wheel 7a, could be connected to a front wheel. Also, separate assemblies could be used for front and rear wheels to provide drive to either or both wheels on the bicycle.

Pedal assembly 122a and free wheel assembly 134a are preferably connected by a connecting means such as a bicycle chain 140a. Such a bicycle chain is well known within the art, and is commonly available from a number of sources. As seen in FIG. 1A, the length of chain required to connect pedal assembly 122a and free wheel assembly 134a is quite long. Consequently, it is preferable to include a chain support 142a which is shown in FIG. 1A, and more specifically in FIG. 3. This chain support operates to maintain tension in the chain to prevent it from kinking or dislodging from either sprocket and further, keeps the chain from hanging down where it might become caught on the rider or an obstruction.

Chain support 142a is preferably mounted to steer mechanism mounting bracket 40a. The support can either be welded, or preferably bolted thereon. Chain support 142a is a bracket which holds two sprockets 143a and 144a which are rotatably mounted thereon. Chain 140a is connected on a return side to sprocket 143a, and is connected on a drive side to sprocket 144a. Isolators 145a are provided between the bracket and each of the sprockets 143a and 144a in order to prevent either the drive side or the return side of chain 140a from jumping off a sprocket or from rubbing with the other length of chain. These isolators 145a can either be separate washers as shown in FIG. 3, or can be integral with the bracket on chain support 142a.

In the preferred bicycle 5a, sprocket 144a is not as important as sprocket 143a, since the drive side of chain 140a will typically in tension, and because the drive side of chain 140a is roughly along the same straight line even without chain support 142a. However, in other configurations it may be more important to include sprocket 144a.

Gear shift mechanism 146a is shown on grab rail 208a in FIG. 1A. This gear shift mechanism is preferably a Shimano Deore DX index shifting shift mechanism. This gear shift mechanism provides two separate levers for controlling the front and rear derailers. While this shift mechanism is shown on grab rail 208a, one skilled in the art will appreciate that the particular location of this mechanism can vary. For instance, the mechanism could be included on a different part of the frame, or could even be included on vertical handlebar 100a. In addition, different manufacturers of gear shift mechanisms are available in the industry. The operation and connection of this mechanism to front derailer 128a and rear derailer 138a is therefore known to one or ordinary skill in the art.

With the preferred pedal assembly 122a and free wheel assembly 134a, a 29 to 92 inch gear range may be obtained. By using different commercially available pedal and free wheel assemblies in the drive assembly, many different gear ranges may alternatively be obtained. In addition, a drive assembly may alternatively be provided without any gears whatsoever, or without a free wheel assembly. Such an assembly, however, would not take into account much of the flexibility and other advantages provided by the preferred drive assembly. Also, alternative drive assemblies to a pedal-driven system could be implemented, such as one driven by the arms of a rider, or one driven by an engine or electric motor.

In operation, any rotation induced on pedals 126a via the rider transfers force from pedal assembly 122a along chain 140a to free wheel assembly 134a to propel bicycle 5a forward. Due to free wheel assembly 134a, the rear wheel 7a is still able to turn even if no rotation is being applied to pedal assembly 122a. Further, different gears may be selected by gear shift mechanism 146a, which controls both front derailer 128a and rear derailer 138a to select different sprockets in pedal assembly 122a and free wheel assembly 134a, respectively. Therefore, when bicycle 5a is interconnected to bicycle 5b to form dual recumbent vehicle 1, varying degrees of power may be provided by a rider on bicycle 5a through the drive assembly, based upon the physical capability of the rider, and upon the gear combination selected through gear shift mechanism 146a. Further, if power is being provided through the drive assembly on bicycle 5b, the rider on bicycle 5a need not pedal, and the pedal assembly 122a will not be induced to rotate by the movement of bicycle 5a. In essence, each rider may provide between 0 and 100% of the power for propelling the vehicle (with the other rider providing the remaining portion), so that the proportion of power being supplied by each rider is variable. Completely independent drive assemblies are thus provided in bicycles 5a and 5b for independent drive of dual recumbent vehicle 1.

RECUMBENT SEAT

Recumbent seat 150a is shown in FIG. 1A. The recumbent seat 150a operates to provide a comfortable and secure seating position for a rider of bicycle 5a. In the recumbent position, a rider has reduced arm and leg fatigue, and less stress on lower neck and back than is found in upright bicycles. Recumbent seat 150a is preferably adjustable among a variety of positions in order to accommodate different size riders.

Recumbent seat 150a includes a seat base 152a and a back rest 154a which provides support for the back of a rider. A mounting bar 153a is provided as part of seat base 152a, and it provides a point at which to mount recumbent seat 150a to frame 10a.

The support surface provided by recumbent seat 150a is provided by mesh insert 156a. The mesh insert 156a is preferably sturdy, yet lightweight, form-fitting and comfortable. It is preferably constructed of a nylon monofilament, although it could alternatively be constructed of a synthetic or natural fiber such as cotton, rayon, polyester, etc. The fabric used should be comfortable, weather resistant, and uv resistant. Further, it is preferable that the mesh insert 156a be removable and replaceable for cleaning. The mesh insert 156a can be secured to seat 150a, for instance, by lacing a series of loops around the tubes in the seat. One skilled in the art will appreciate that a number of methods could be used to fit the insert on the seat.

As an alternative to the mesh insert 156a, the recumbent seat 150a could use hard or padded panels, or spring-filled panels such as the type used in automobiles. It has been found, however, that the preferred mesh insert provides a cost effective, lightweight, comfortable, and sturdy surface for use with recumbent seat 150a.

Figure 6:
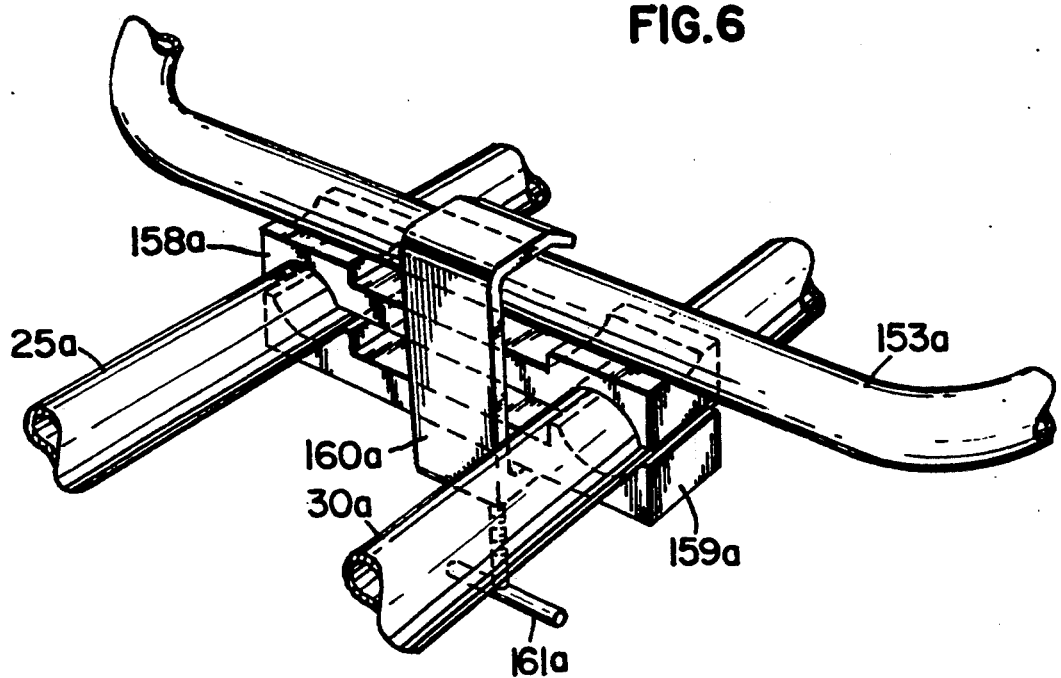
FIG. 6 is an enlarged fragmentary perspective view of a preferred recumbent seat mounting assembly consistent with the invention.

Recumbent seat 150a is preferably mounted to frame 10a at two separate points. First, recumbent seat 150a is mounted at its mounting bar 153a to parallel tubes 25a and 30a. This mounting in shown in FIG. 6 (see also FIG. 3). A seat mounting assembly 157a, which includes members 158a and 159a, is used to connect recumbent seat 150a to parallel tube members 25a and 30a. As can be seen in FIG. 6, members 158a and 159a have recesses corresponding to parallel tubes 25a and 30a, and are configured such that member 158a is placed on the top side of the parallel tubes (between the tubes and recumbent seat 150a in operation), and member 159a is placed on the bottom side of the tubes. Member 158a is secured to the mounting bar 153a of recumbent seat 150a along a recess located opposite the recesses for accepting the parallel tubes, which is fitted to accept mounting bar 153a. Preferably, member 158a is welded to mounting bar 153a, although different commonly-known fastening methods could be used. Member 158a further includes a bracket 160a which is welded, or otherwise fastened, to a side of member 158a. This bracket is sized such that when members 158a and 159a are placed in an operative position with the parallel tubes sandwiched therebetween, an adjustment bolt 161a may be used to apply pressure to the bottom of member 159a in order to secure parallel tubes 25a and 30a between members 158a and 159a.

In operation, parallel tubes 25a and 30a provide a sturdy support for recumbent seat 150a. Unlike single-tube structures, which have the tendency to allow a seat to rotate about the tube on which it is mounted, the parallel tube structure of bicycle 5a prevents such rotation. Further, using bolt 161a, with a preferred hand-operated handle, members 158a and 159a may be loosened easily in order to enable recumbent seat 150a to slide along parallel tubes 25a and 30a to allow adjustment for different size riders, and may be retightened easily to secure seat 150a in an operating position.

The second point at which recumbent seat 150a is mounted to frame 10a is shown in FIG. 7. Recumbent seat 150a has a generally U-shaped seatback support 169a which is connected across back rest 154a (See also FIG. 1A). A pair of brackets 166a and 167a are welded thereto, and each has an aperture for fitting a bolt 168a or other fastening device. A slide tube 164a, which is generally T-shaped, is connected thereto, between brackets 166a and 167a. With bolts 168a secured to slide tube 164a, this slide tube is able to rotate within brackets 166a and 167a.

Slide tube 164a is sized such that it fits within the guide tube 62a mounted on rack 54a of frame 10a. This guide tube 62a contains a clamp collar 162a having a hand-operated bolt for allowing quick tightening and loosening of this clamp collar. When clamp collar 162a is tightened down, slide tube 164a is securely held within guide tube 62a, and recumbent seat 150a is secured. When this clamp collar 162a is loosened, slide tube 164a will be able to slide freely within guide tube 62a.

In some instances, it may preferable to include slots within the apertures in brackets 166a and 167a. This enables slide tube 164a to fit easier into guide tube 62a, so that less stringent tolerances to be placed on the construction of recumbent seat 150a and frame 10a.

Therefore, in order to adjust recumbent seat 150a, bolt 161a of the seat mounting assembly 157a is loosened, and the clamp collar 162a on guide tube 62a is loosened. With both of these devices loosened, parallel tubes 25a and 30a are allowed to slide within members 158a and 159a, and slide tube 164a is enabled to slide within guide tube 62a. When the desired seat position has been achieved, the seat is operatively secured to frame 10a by tightening bolt 161a in seat mounting assembly 157a, and by tightening clamp collar 162a on guide tube 62a.

An additional feature may be provided by constructing back rest 154a to be pivotably connected to seat base 152a. This pivotal connection could be made by any of a number of known pivoting mounting systems, such as hinges. If this pivotal option was provided, the seat mounting assembly 157a and the seatback mounting assembly 163a would individually be able to be adjusted, and both the forward, rear position of recumbent seat 150a, and the recline of back rest 154a, would be individually adjustable.

Additional components are also provided on bicycle 5a. As can be seen in FIG. 1B, front and rear brakes 170a and 171a are provided, such as of the type manufactured by DiaCompe. Various alternative brakes which are commercially-available may be used in lieu of these brakes. The controllers for these brakes, 105a and 209a, as discussed above, are preferably included on vertical handlebar 100a for front brake 171a, and on grab rail 208a for rear brake 170a, respectively. Various locations for the brake controls, besides those shown in FIG. 1A, are known by one of ordinary skill in the art.

Bicycle 5A may also preferably include a front fender 213a and a rear fender 214a. Front fender 213a is preferably connected to fork 76a at its fender mounting connection. Likewise, rear fender 214a is preferably connected to rack 54a, along with rear brake 170a, at the brake/fender mount 64a. These fenders prevent mud or other debris from flying up and hitting the rider. Their use and installation is well known within the art.

Bicycle 5a, as described above, is therefore capable of being independently operated, steered and driven by a single rider. However, various modifications to the design of bicycle 5a may be made which are within the spirit and scope of the invention.

CROSS-BRACING

In order to structurally interconnect bicycles 5A and 5B, a number of brace numbers 172 are preferably used, as shown in FIG. 2. These brace members operate to structurally connect the frames of bicycles 5A and 5B. They provide lateral stability (i.e. side-to-side stability), as well as longitudinal stability (i.e. forward-to-rear stability). It is preferable that little flexibility be provided in these brace members 172 so that dual recumbent vehicle 1 will have both the look and feel of a single unitary unit, rather than simply two independent bicycles joined together. Further, it is preferable that the brace members be quickly and easily connected and disconnected to each of the bicycle frames. This enables users to convert bicycles 5a and 5b from independent units to a single dual recumbent vehicle 1, and vice versa, with relatively little effort.

The preferred bracing members 172 are shown connected between bicycles 5a and 5b in FIG. 2. These brace members 172 include a rear brace 174, a middle brace 176, a forward brace 178, and a stabilizer member 180. The connections between bracing members 172 and bicycles 5a and 5b are numbered 188, and will be discussed in greater detail below.

It is preferable that the brace members 172, when connected to each of the bicycle frames, are found in more than one plane. It is believed that this three dimensional bracing structure provides greater stability in all directions for dual recumbent vehicle 1 than could be obtained by interconnecting all of brace members 172 in a single plane. It can be seen that while stabilizer member 180 and rear brace 174 are connected in a single plane along the parallel tube structure of the frames on bicycles 5A and 5B, the middle brace 176 and forward brace 178 are found in separate planes.

Rear brace 174 is preferably mounted at connections 188 to the double-tube structure cross-braces, such as cross-brace 32a on frame 10a. Middle brace 176 is preferably connected to each bicycle frame at its respective front frame support, such as front frame support 44a on frame 10a. This middle brace 176 is preferably identical to rear brace 174. Therefore, the same manufactured part may be used interchangeably as either rear brace 174 or middle brace 176.

Forward brace 178 is preferably connected to the pedal assembly housing on each bicycle, such as pedal assembly housing 46a on frame 10a. This forward brace 178 could be identical to the part used for rear brace 174 and middle brace 176, as the preferred distance between the connections is the same for all three parts. However, it is preferable that forward brace 178 be generally U-shaped (i.e., having a pair of offset and generally parallel members joined at similar ends by a transversely extending cross-brace) and project downward generally perpendicular to bottom tube 48a when connected to each frame, in order to provide a bumper and a handle for tilting dual recumbent vehicle 1 into the vertical position (See FIG. 1A).

Stabilizer member 180 is smaller in width than rear brace 174, middle brace 176, and forward brace 178. Rather than being connected to each frame along the median axis 230 thereof, stabilizer member 180 is connected to each frame along an outside edge of one of the tubes in the parallel double-tube structure, such as tube 25a or 30a in frame 10a. This stabilizer member 180 includes a straight leg member 181, and a generally A-shaped member 182 (i.e., a member having a pair of straight members joined at a vertex and extending away therefrom at an angle from one another, or alternatively a single member bent to form two straight portions connected at a vertex; with the straight members or portions joined by a cross-brace). The angled portion, or the vertex, of A-shaped member 182, is connected proximate the center point of leg member 181. As can be seen in FIG. 2, stabilizer member 180 is connected at two connections to each bicycle frame, at the free ends of leg member 181 and A-shaped member 182.

It is believed that stabilizer member 180 provides the necessary forward-to-rear stabilization for dual recumbent vehicle 1. Whenever breaking or drive forces are generated by the rider in either bicycle 5A and 5B, it is believed that stabilizer member 180 prevents one of the bicycles from "overtaking" the other bicycle.

In addition to providing the necessary structural support for dual recumbent vehicle 1, brace members 172 provide a convenient mount for a variety of accessories for the vehicle. Middle brace 176, being in a central location between the riders, can be used to mount, for instance, a rear-view mirror, such as mirror 177a shown in FIG. 1A. In addition, such accessories as a head light, a trip computer, a hand pump, a horn, or water bottles could be mounted to this brace. Stabilizer member 180, also being in a centrally-located position in the vehicle, may also be used to mount some of these accessories.

Forward brace 178 can also be used to mount accessories. However, being U-shaped, forward brace 178a operates effectively as a handle for the forward end of the vehicle, to facilitate raising the vehicle in its vertical position for storage or maintenance. As can be seen in FIG. 1A, forward brace 178 extends downward near to the ground when the vehicle is in its normal operating position. When the vehicle is raised to its vertical position, the forward brace 178 is therefore more conveniently located than a simple brace which extends across between the pedal assembly housings. Forward brace 178 also operates effectively as a bumper for dual recumbent vehicle 1.

Another accessory which may be mounted to brace members 172 is a storage compartment 184 which is shown in FIG. 1B. Storage compartment 184 is preferably a two-piece design, with a cover 186 which is easily removable, so that storage compartment 184 can be used with or without a cover. Storage compartment 184 preferably has flanges (not shown) which enable it to rest on rear brace 174 and leg member 181 of stabilizer member 180. It is preferable that this storage compartment 184 simply rest on these members, or that it be strapped down with bungee cords or another easily-removable fastening system (not shown) in order to prevent rattling and to provide a more secure connection.

One further addition to storage compartment 184 is to add a handle which enables the compartment to be carried as a suitcase once it is removed from dual recumbent vehicle 1. Another improvement is to add a locking mechanism for preventing theft of articles stored in compartment 184.

Various alternative constructions of brace members 172 could be implemented in lieu of the preferred structure shown in FIG. 2. One skilled in the art will appreciate that a different number of members, or a different placement of the members, on the frames of bicycles 5a and 5b could be implemented in order to provide the necessary structural support. However, it has been found that the connections shown in FIG. 2 provide ample support, while remaining relatively easy to connect and disconnect from bicycles 5a and 5b.

As can be seen in FIG. 2, a number of connections 188 are shown connecting the brace members 172 to the frames of bicycles 5a and 5b. These connections are preferably between receiving members 190 on brace members 172 and connecting members 200 on the frames of bicycles 5a and 5b. It is preferable that each connecting member 200 and each receiving member 190 is attached to its respective frame or brace member by a welded connection. One skilled in the art will, however, appreciate that bolts or other fastening methods could be used alternatively. The frames of bicycle 5a and 5b each contain a number of connecting members 200 for connecting on either side to brace members 172. FIGS. 8A–8E show the exact placement of many of these connecting members 200.

FIG. 8A shows the location of one connecting member 200 which is used for connecting to rear brace 174. This connector is placed on cross-brace 32a which is located between parallel tubes 25a and 30a on frame 10a. The bottom of this connecting member 200 protrudes somewhat below each of the parallel tubes. It is preferable that this connector be located at the center of cross-brace 32a, along median line 230 seen in FIG. 2.

FIG. 8B shows a connecting member 200 for connecting to leg member 181 of stabilizer member 180. This connector is preferably located on the outside edge of parallel tube member 30a, directly opposite cross-brace 34a, and near the connection of side rack member 60a. An identical member is found on the opposite side of parallel tube 25a, symmetrically placed with respect to median line 230 (See FIG. 2).

FIG. 8C shows connecting member 200 for A-shaped member 182 of stabilizing member 180. This connecting member 200 is preferably located on the outside edge of parallel tube 30a directly opposite steer mechanism mounting plate 40a and fixed member 82a of steer mechanism 81a. An identical member is located at the same position on parallel tube member 25a. These two connecting members 200 are symmetrically placed along median plane 230, as seen in FIG. 2.

FIG. 8D shows connecting member 200 for use with middle brace 176. This single member 200 is preferably located along the bottom side of front frame support 44a along median line 230. This connecting member is preferably oriented 90° from the other connecting members 200 for the other braces, i.e. its peg 202 faces fork housing 42a, rather than facing downward.

FIG. 8E shows connector 200 fork connection with forward brace 178. It is preferably located along the median line 230 (shown in FIG. 2) along the forward side of pedal assembly housing 46a.

Therefore, it can be seen that frame 10a of bicycle 5a includes seven connecting members 200. Three of these connecting members are located along median line 230: one on cross-brace 32a, one on front frame support 44a, and one on pedal assembly housing 46a. Further, four of the connecting members are located on the outside edges of parallel tubes 25a and 30a. Two of these members are oppositely disposed to one another proximate cross-brace 34a, and two of these members are oppositely disposed proximate steer mechanism mounting plate 40a. Bicycle 5b, being identical to bicycle 5a, has the same connecting members 200 located thereon.

Each of the brace members 172 has receiving members 190 at each end thereof in order to connect to these connecting members 200 found on bicycles 5a and 5b. A receiving member is preferably welded at the end of each brace member 172, although the orientation of these members will vary with each brace member.

Figure 9:
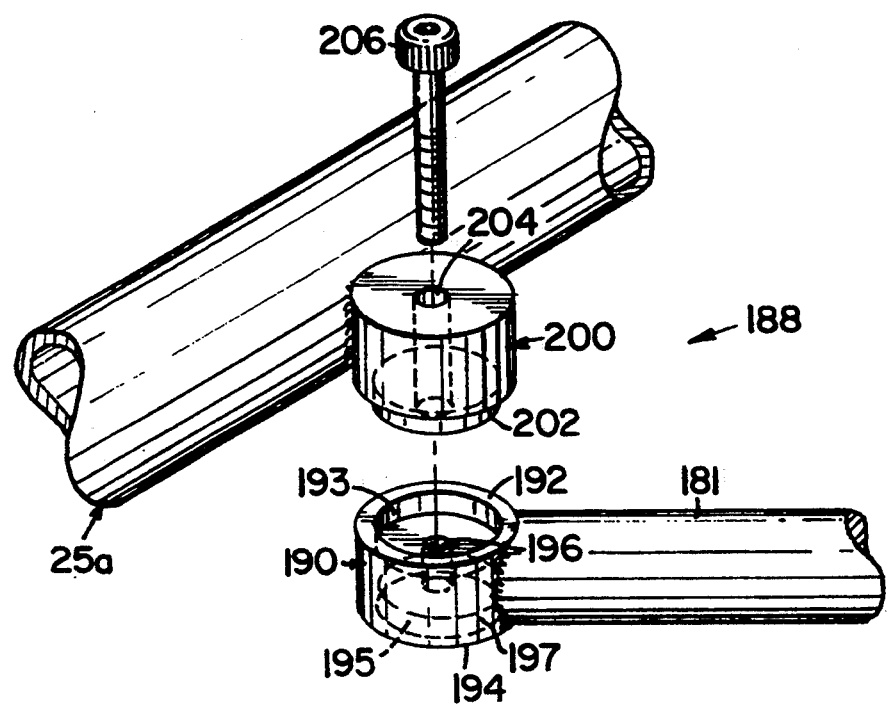
FIG. 9 is an exploded enlarged fragmentary perspective view of a preferred connection between a preferred stabilizer member and a bicycle frame.

FIG. 9 shows a connection 188 for the connection between leg member 181 of stabilizing member 180 and parallel tube 25a of bicycle 5a. It will be appreciated that the connections for the other brace members 172 operate in the same manner.

As can be seen in FIG. 9, connecting member 200, which is preferably welded to parallel tube 25a, is roughly cylindrical in shape. A peg 202 is found along a bottom side of connecting member 200, and is roughly cylindrical and sized with a smaller diameter than the main portion of connecting member 200. Further, an aperture 204 extends from the top side to the bottom side of connecting member 200, generally along the median axis of connecting member 200. This aperture 204 is preferably of sufficient diameter to enable a fastening member 206 to fit within. Alternatively, this aperture 204 could be threaded to enable fastening member 206 to be threaded within this aperture.

Leg member 181 has a receiving member 190 preferably welded at its end. This receiving member is also cylindrically shaped, having a cylindrical wall 197 and top and bottom sides 192 and 194, respectively. Receiving member 190 is preferably welded along its cylindrical wall 197 to the end of leg member 181. The connecting members used at the ends of rear brace 174, middle brace 176, and A-shaped member 182 are also welded along their cylindrical walls 197. However, as will be discussed later, the receiving members used on forward brace 178 are preferably welded along their bottom sides, rather than their cylindrical walls.

Receiving member 190 has generally the same dimensions as connecting member 200. On each side of receiving member 190, a recess is formed. On the top side 192 of connecting member 190, recess 193 is defined. Also, on bottom side 194, a similarly sized recess 195 is defined. Each of these recesses 193 and 195 is of sufficient diameter and depth to receive peg 202 on connecting member 200. Receiving member 190 further has a threaded aperture 196 which extends from the top side 192 to the bottom side 194. This threaded aperture 196 is capable of receiving fastening member 206.

Fastening member 206 is preferably a threaded bolt having a hex head suitable for being turned by an allen wrench. Other types of bolts or other fastening members which are known in the art may be used in the alternative for fastening member 206.

In order to connect leg member 181 of stabilizing member 180 to parallel tube 25a of bicycle 5a, receiving member 190 is fit over connecting member 200 such that receiving recess 193 receives peg 202. Since receiving recesses 193 and 195 are identical, however, one skilled in the art will appreciate that stabilizing member 180 could be rotated 180°, and receiving recess 195 could be used to receive peg 202.

Once receiving member 190 and connecting member 200 have been placed with peg 202 in receiving recess 193, threaded fastener 206 is placed through aperture 204 and into aperture 196. By turning fastener 206 to thread it within threaded aperture 196, receiving member 190 may be securely attached to connecting member 200.

Connection 188 which is formed between receiving member 190 and connecting member 200 is designated a "peg-in-hole" connection. This connection provides excellent lateral stability for dual recumbent vehicle 1, due to this configuration having a portion of one member fit inside the other member.

In order to disconnect receiving member 190 and connecting member 200, all that a user needs to do is unscrew fastening member 206 using an allen wrench or other suitable type of wrench for the fastening member used. With fastening member 206 removed, receiving member 190 and connecting member 200 easily come apart. Therefore, it can be seen that the connection formed between these two members is secure, while being easy to connect and disconnect.

All of the other connections between brace members 172 and bicycles 5a and 5b operate in a similar manner. In addition, all of the receiving members are welded at their cylindrical walls onto the ends of rear brace 174, stabilizing member 180, and middle brace 176 similarly to the configuration shown in FIG. 9. However, for forward brace 178, it is preferable that receiving member 190 be welded to the ends of forward brace 178 on bottom side 194, rather than along cylindrical wall 197. It has been found that this provides a more aesthetic appearance which is easier to manufacture, however, one of ordinary skill in the art will appreciate that the same connections used for the other brace members 172 could also be used for forward brace 178 as well.

Therefore, in order to interconnect the frames of bicycles 5a and 5b, a user must place each of the brace members 172 so that the receiving members 190 at each of their ends are placed in abutting relationships with their corresponding connecting members 200 in the "peg-in-hole" configuration. The connections therebetween are then secured by threading fastening members 206 through the apertures of connecting members 200 and receiving members 190. One skilled in the art will appreciate that this may be performed in any order in order to interconnect the two bicycles. For instance, all of the brace members 172 could be connected to their respective connections on bicycle 5a or 5b first, and then connected to the next bicycle. Alternatively, each brace member 172 could be connected to both bicycles before the next brace member is attached.

As can be seen in FIG. 2, the connecting members 200 connected to frame 10a are located symmetrically along median line 230. This enables connections to brace members 172 to be made on either the left or right side of bicycle 5a. This enables bicycles 5a and 5b to be essentially interchangeable. That is, they may be connected with bicycle 5a on the left and bicycle 5b on the right, or can be connected with bicycle 5a on the right and bicycle 5b on the left. In addition, this enables bicycles 5a and 5b to be manufactured identically—different components are not necessary to construct each bicycle. As can be seen in FIG. 1A, preferred bicycles 5a and 5b are identical except for the placement of handlebars and grab rails, which, as discussed above, are easily connectable to either side of a bicycle depending on user preference. It can also be seen that, when brace members 172 are not used to interconnect bicycles 5a and 5b, the only connecting apparatus which is left on the frames of bicycles 5a and 5b are connecting members 200, which are relatively small and do not interfere significantly from the performance or appearance of the bicycles.

Another advantage of the symmetrical structure of bicycles 5a and 5b is that the two connecting members 200 on each bicycle which are not used when the bicycles are interconnected may be used to connect a grab rail, such as grab rail 208a, which is seen generally in FIGS. 1A and 2. This grab rail 208a has a pair of receiving members 190 welded thereon similarly to the receiving members 190 on stabilizer member 180. Further, grab rail 208a is sized such that the receiving members are the same distance apart as the receiving members found on stabilizing member 180. Therefore, these receiving members 190 preferably fit precisely with the connecting members 200 on bicycles 5a and 5b which are used primarily to connect with stabilizing member 180. As can be seen in FIG. 1A grab rail 208a, when bicycles 5a and 5b are interconnected, is secured to bicycle 5a along its outer side in the connectors used for stabilizing member 180. Also, as receiving members 190 are symmetrical with respect to their top and bottom sides, an additional grab rail which is manufactured the same as grab rail 208a may be used on the other side of the bicycle, or as shown in FIG. 1A, may be used on bicycle 5b on its outer side.

Grab rail 208a provides a convenient hand hold underneath the rider of bicycle 5a. Further, grab rail 208a preferably has a brake control 209a and gear shift mechanism 146a mounted thereto. Therefore, the brake and gear selection may be conveniently performed within easy reach of the operator.

One skilled in the art will appreciate that, in some instances when bicycle 5a is not connected to bicycle 5b, an additional grab rail may be implemented so that bicycle 5a has grab rails mounted on both sides thereof. Also, one skilled in the art will appreciate that in some instances a user may desire for no grab rails to be mounted to bicycle 5a. It can be seen that the flexible mounting system provided enables a wide variety of grab rail combinations to be implemented for bicycles 5a and 5b. In addition, one skilled in the art will appreciate that additional grab rails could be provided at other points on frame 10a, which could be welded permanently or affixed with a "peg-in-hole" connection 188.

Alternative connections may be used to interconnect bicycles 5a and 5b to brace members 172. However, it has been found that the "peg-in-hole" configuration shown herein is quick and easy to assemble/disassemble, and the connections formed thereby are secure, stable, and provide the necessary stability for dual recumbent vehicle 1.

STEERING COUPLING

In order to provide dual recumbent vehicle 1 with an integrated steering system, a steering coupling mechanism 210, as seen in FIG. 1A, is used to connect the steering assemblies of bicycles 5a and 5b. By using steering coupling mechanism 210, a rider on either bicycle 5a or 5b is able to effectively steer dual recumbent vehicle 1. Further, the preferred steering coupling mechanism 210 is easily disconnectable, so that bicycles 5a and 5b may be independently controlled when they are not structurally interconnected by brace members 172.

Steer coupling mechanism 210 is shown in greater detail in FIG. 4. Coupling mechanism 210 includes a tie-rod 211 having spherical tie-rod ends 212 attached at each end, such as manufactured by Aurora bearing. The length of this tie-rod 211 is adjustable by threading each of the tie-rod ends 212 onto the tie-rod 211 by varying amounts. This adjustment feature enables the alignment of the forks on bicycles 5a and 5b to be properly set. Each tie-rod end 212 of coupling mechanism 210 is connected to one of the fork steer couplers affixed to the forks on bicycles 5a and 5b. For bicycle 5a this is shown as fork steer coupler 80a and for bicycle 5b, this is shown as fork steer coupler 80b. Each tie-rod end 212 of steering coupler mechanism 210 is attached to a fork steer coupler by a bolt or other commonly-known fastening system, such that it is able to rotate relative thereto. The connection point for tie-rod end 212 to fork steer coupler 80a is aperture 117a. Likewise, the connection for fork steer coupler 80b is aperture 117b.

By using steering coupling mechanism 210, forks 76a and 76b of bicycles 5a and 5b, respectively, operate in unison. As can be seen in FIG. 4, a rotation induced on handlebar 100a, for instance, in the direction of arrow 220 is transferred to steer extension 94a in the direction of arrow 221, which is transferred to fork steer coupler 80a in the direction of arrow 222, and by operation of tie-rod 211 and tie-rod ends 212, is transferred to fork steer coupler 80b in the direction of arrow 223.

It is preferable that the fastening system used to connect tie-rod ends 212 to the fork steer couplers be allen head bolts, although other types of bolts are known in the art. This fastening system is preferably capable of being assembled and disassembled relatively easily, so that bicycles 5a and 5b may be connected and disconnected from one another relatively easily. Further, it is preferable that the same allen wrench be used for fastening members 206 for the cross-bracing and for fastening tie-rod ends 212 to the fork steer couplers, so that one wrench may perform all of the assembly and disassembly functions for dual recumbent vehicle 1.

Also, it is preferable that when steering coupling mechanism 210 is not connected between bicycles 5a and 5b, none of the apparatus is left on either bicycle so that the performance and appearance of either bicycle is not interfered with. By using tie-rod ends 212 as shown herein, only apertures 117a and 117b are left when steering coupling mechanism 210 is removed.

Alternative steering coupling mechanisms may be used in lieu of steering coupling mechanism 210. For instance, a tie-rod could be connected between the steer mechanisms on bicycle 5a and 5b, rather than by connecting the forks by their fork steer couplers.

OPERATION

As seen in FIG. 1A, the preferred dual recumbent vehicle 1 provides an advantageous form of transportation and exercise. When bicycles 5a and 5b are interconnected by the cross-bracing system, one rider is able to operate the vehicle by sitting in either seat of bicycle 5a and 5b, or two riders are able to sit in both bicycles. The orientation of the pedal assembly, the steering handlebars, and the recumbent seat provide a comfortable orientation for a rider. The handlebars and recumbent seat are also adjustable to accommodate various sizes of riders. Further, the location of accessories, the handlebars, the brake controls, the gear shift mechanism and the hand holds are all conveniently located for a rider.

Given the coupled steering mechanisms, either rider from either bicycle is able to control the steering for the entire vehicle. Further, given the independent drive assemblies for bicycles 5a and 5b, each rider is able to independently select a gearing ratio, and is able to provide a different relative amount of power used to move the vehicle. In addition, due to the free wheel assemblies on each bicycle, one rider may simply rest his or her feet on the pedal assembly while the other rider pedals. The vehicle is also inherently balanced, and does not require each rider to focus on balancing his or her body in order to keep the vehicle upright, due to the four wheel footprint of the vehicle.

Connection and disconnection of bicycles 5a and 5b is also a simple task for a user. With the "peg-in-hole" connection system disclosed herein, a user is able to quickly and easily connect and disconnect brace members 172 from bicycles 5a and 5b. Further, the steering coupling mechanism 210 is also easily connectable/disconnectable, preferably using the same allen wrench for the bolts which hold the tie-rod ends to the fork steer couplers. As also described above, either bike 5a or 5b can be interchanged and interconnected on either side.

Once disconnected, bicycles 5a and 5b are also independently operated by a rider. All of the necessary steering, power, and braking controls are provided for a rider to independently operate bicycle 5a or 5b.

For storage and/or maintenance dual recumbent vehicle 1 may be tilted upright for a vertical storage feature. When bicycles 5a and 5b are interconnected to form dual recumbent vehicle 1, the entire vehicle may be tilted up by lifting on forward brace 178 until the entire assembly is balanced on the vertical support members at the ends of the parallel tubes and top rack members of bicycles 5a and 5b. Also, when bicycles 5a and 5b are disconnected and are independent, each still contains the necessary vertical support members at the ends of its parallel tubes and top rack members to be independently balanced in its vertical storage position. In an alternative embodiment, dual recumbent vehicle 1 could be provided with as few as three vertical support members, to enable it to be stored in the vertical position.

Various modifications to the preferred embodiment disclosed herein may be made without departing from the spirit and scope of the invention. For example, more than two bicycles could be coupled together in the manner disclosed herein in order to allow for more than two riders. In addition, a rear seat or baby seat could also be provided in order to provide the capacity for additional passengers. There might also be included a trailer attachment for pulling a trailer or Burly. A foul weather cover might also be implemented to protect the riders from the elements. Stabilization could also be enhanced by outrigger wheels or other structure which would prevent tipping.

The above discussion, examples and embodiments illustrate our current understanding of the invention. However, one skilled in the art will appreciate that various changes may be made without departing from the spirit and scope of the invention. Therefore, the invention resides wholly in the claims hereinafter appended.

We claim:
1. A dual recumbent vehicle, comprising:
   (a) a pair of recumbent bicycles, each bicycle having an operator-controlled steering assembly, an operator-controlled drive assembly, and a recumbent seat operatively connected to a frame structure, the frame structure having a first and a second side and a forward and a rear end;
(b) means for interconnecting the pair of bicycles in a side-by-side relationship comprising:
  (i) cross-bracing means for operatively connecting one of the pair of bicycles on its first side to the other of the air of bicycles on its second side; and
  (ii) steering coupling means for coupling the steering assemblies of the bicycles such that the steering assemblies operate in unison; and
(c) vertical support means for balancing the dual recumbent vehicle in a vertical position with the forward ends of the frame structures of the pair of bicycles positioned generally above the rear ends, the vertical support means comprising at least three vertical support members extending generally toward the rear ends of the frame structures, each vertical support member having an end arranged and configured such that the ends of the vertical support members will support and balance the dual recumbent vehicle in the vertical position.

2. A dual recumbent vehicle, comprising:
(a) a pair of recumbent bicycles, each bicycle having an operator-controlled steering assembly, an operator-controlled drive assembly, and a recumbent seat operatively connected to a frame structure, the frame structure having a first and a second side and a forward and a rear end, and the steering assembly including:
  (i) a fork rotatably mounted on the frame structure for steering a bicycle wheel rotatably mounted thereon;
  (ii) a steer mechanism having a fixed member mounted to the frame structure and a rotatable member rotatably connected to the fixed member, the rotatable member being rotatable along a rotational axis;
  (iii) a vertical handlebar operatively connected to the steer mechanism, the vertical handlebar including:
    (1) a first portion having a first end and a second end, the first portion being operatively connected at the first end to the rotatable member and being generally perpendicular to the rotational axis; and
    (2) a second portion connected to the second end of the first portion and generally perpendicular to the first portion; and
  (iv) a tie rod operatively connected between the fork and the steer mechanism such that a rotation of the handlebar induces a rotation of the fork; and
(b) means for interconnecting the pair of bicycles in a side-by-side relationship comprising:
  (i) cross-bracing means for operatively connecting one of the pair of bicycles on its first side to the other of the pair of bicycles on its second side; and
  (ii) steering coupling means for coupling the steering assemblies of the bicycles such that the steering assemblies operate in unison.

3. The dual recumbent vehicle of claim 2, wherein the steering assembly further comprises:
(a) first adjusting means for selectively securing the first portion of the handlebar at one of a plurality of lengths; and
(b) second adjusting means for selectively securing the first portion of the handlebar at one of a plurality of rotational positions relative to the rotatable member.

4. The dual recumbent vehicle of claim 2, wherein the steering assembly further comprise a horizontal handlebar operatively connected to the rotatable member generally opposite the vertical handlebar and generally perpendicular to the rotational axis.

5. The dual recumbent vehicle of claim 2 wherein the steering coupling means comprises a tie rod operatively connected between the forks on each of the bicycles, whereby a rotation of the handlebar on either of the bicycles induces a rotation of the forks on each of the bicycles.

6. The dual recumbent vehicle of claim 2 further comprising seat adjustment means for selectively securing the recumbent seat at one of a plurality of positions on the frame structure.

7. The dual recumbent vehicle of claim 6, wherein the frame structure comprises a pair of parallel tubes extending from the rear end of the frame structure and generally towards the forward end, wherein a bicycle wheel is rotatably mounted between the pair of parallel tubes, and wherein the seat adjustment means comprises a seat mounting assembly operatively connected to the recumbent seat and slidably mounted on the pair of parallel tubes, the seat mounting assembly having a quick-release mechanism for selectively securing the seat mounting assembly at one of a plurality of positions on the pair of parallel tubes.

8. The dual recumbent vehicle of claim 7, wherein the frame structure further comprises a seatback guide tube generally parallel to the pair of parallel tubes, and wherein the seat adjusting means further comprises a seatback mounting assembly operatively connected to a back portion of the recumbent seat and slidably mounted within the seatback guide tube, the seatback mounting assembly having a quick-release mechanism for selectively securing the seatback mounting assembly at one of a plurality of positions within the seatback guide tube.

9. A dual recumbent vehicle, comprising:
(a) a pair of recumbent bicycles, each bicycle having an operator-controlled steering assembly, an operator-controlled drive assembly, and a recumbent seat operatively connected to a frame structure, the frame structure having a first and a second side and a forward and a rear end, and the steering assembly including:
  (i) a fork rotatably mounted on the frame structure for steering a bicycle wheel rotatably mounted thereon;
  (ii) a steer mechanism having a fixed member mounted to the frame structure and a rotatable member rotatably connected to the fixed member, the rotatable member being rotatable along a rotational axis and having a handlebar operatively connected thereto;
  (iii) a tie rod operatively connected between the fork and the steer mechanism such that a rotation of the handlebar induces a rotation of the fork; and
  (iv) a centering mechanism operatively connected between the fork and the steer mechanism, for inducing the fork to return to a centered position; and (b) means for interconnecting the pair of bicycles in a side-by-side relationship comprising:
  (i) cross-bracing means for operatively connecting one of the pair of bicycles on its first side to the other of the pair of bicycles on its second side; and
  (ii) steering coupling means for coupling the steering assemblies of the bicycles such that the steering assemblies operate in unison.

10. A dual recumbent vehicle, comprising:
(a) a pair of recumbent bicycles, each bicycle having an operator-controlled steering assembly, an operator-controlled drive assembly, and a recumbent seat operatively connected to a frame structure, the frame structure having a first and a second side and a forward and a rear end, and the drive assembly including:
  (i) a pedal assembly rotatably mounted at a forward location on the frame structure;
  (ii) a freewheel assembly operatively connected to a bicycle wheel which is rotatably mounted on the frame structure such that a rotation induced in the freewheel assembly in a forward direction induces a rotation in the bicycle wheel and a rotation induced in the freewheel assembly in a backward direction does not induce a rotation in the bicycle wheel;
  (iii) gear selection means for selecting between a plurality of gear combinations on the pedal assembly and the freewheel assembly;
  (iv) a chain operatively connected between the pedal assembly and the freewheel assembly such that a rotation induced in the pedal assembly induces a rotation of the freewheel assembly; and
  (v) an intermediate chain support operatively connected to the frame structure, for guiding and maintaining tension in the chain; and
(b) means for interconnecting the pair of bicycles in a side-by-side relationship comprising:
  (i) cross-bracing means for operatively connecting one of the pair of bicycles on its first side to the other of the pair of bicycles on its second side; and
  (ii) steering coupling means for coupling the steering assemblies of the bicycles such that the steering assemblies operate in unison.

11. A dual recumbent vehicle, comprising:
(a) a pair of recumbent bicycles, each bicycle having an operator-controlled steering assembly, an operator-controlled drive assembly, and a recumbent seat operatively connected to a frame structure, the frame structure having a first and a second side and a forward and a rear end, the frame structure further having a plurality of connecting members; and
(b) means for interconnecting the pair of bicycles in a side-by-side relationship comprising:
  (i) cross-bracing means for operatively connecting one of the pair of bicycles on its first side to the other of the pair of bicycles on its second side, the cross-bracing means comprising a plurality of brace members, each brace member having a first and a second end and having at least one receiving member at each of the first and second ends, each receiving member on the plurality of bracing members being operatively connected to a corresponding connecting member on one of the frame structures of the bicycles by a fastening member, wherein:
    (1) each of the receiving members comprises a first side having a receiving recess defined therein along a receiving axis, a second side opposite the first side and having a receiving recess defined therein along the receiving axis, and a threaded aperture located between the first and second side receiving recesses along the receiving axis;
    (2) each of the connecting members comprises a peg defined along a connecting axis and sized to fit within a receiving recess on a receiving member, and an aperture defined through the connecting member and peg along the connecting axis, and sized to receive a fastening member; and
    (3) each of the fastening members comprises a threaded fastener, whereby when a connecting member is arranged such that its peg is disposed within a receiving recess on a receiving member, the connecting member is securable to the receiving member by threading a fastening member through the apertures in the connecting and receiving members; and
  (ii) steering coupling means for coupling the steering assemblies of the bicycles such that the steering assemblies operate in unison.

12. A dual recumbent vehicle, comprising:
(a) a pair of recumbent bicycles, each bicycle having an operator-controlled steering assembly, an operator-controlled drive assembly, and a recumbent seat operatively connected to a frame structure, the frame structure having a first and a second side and a forward and a rear end, the frame structure further having a plurality of connecting members; and
(b) means for interconnecting the pair of bicycles in a side-by-side relationship comprising:
  (i) cross-bracing means for operatively connecting one of the pair of bicycles on its first side to the other of the pair of bicycles on its second side, the cross-bracing means comprising a plurality of brace members, each brace member having a first and a second end and having at least one receiving member at each of the first and second ends, each receiving member on the plurality of bracing members being operatively connected to a corresponding connecting member on one of the frame structures of the bicycles by a fastening member, wherein the plurality of connecting members on each bicycle is comprised of a plurality of first connecting members and a plurality of second connecting members, and wherein the plurality of first connecting members is for connecting the plurality of bracing members to the first side of the frame structure and the plurality of second connecting members is for connecting the plurality of bracing members to the second side of the frame structure, whereby each of the bicycles is interchangeable and can be operatively connected to the plurality of bracing members on its first or second side; and
  (ii) steering coupling means for coupling the steering assemblies of the bicycles such that the steering assemblies operate in unison.

13. The dual recumbent vehicle of claim 12, wherein each bicycle further comprises a grab rail, the grab rail having at least one receiving member operatively connectable to at least one of the first connecting members and at least one of the second connecting members, whereby when the plurality of bracing members are connected to the first side of the frame structure, the grab rail is operatively connected to the at least one of the second connecting members, and when the plurality of bracing members are connected to the second side of the frame structure, the grab rail is operatively connected to the at least one of the first connecting members.

14. The dual recumbent vehicle of claim 12 wherein the plurality of bracing members are arranged and configured in at least two planes.

15. A dual recumbent vehicle, comprising:
(a) a pair of recumbent bicycles, each bicycle having an operator-controlled steering assembly, an operator-controlled drive assembly, and a recumbent seat operatively connected to a frame structure, the frame structure having a first and a second side and a forward and a rear end, the frame structure further having a plurality of connecting members;
(b) means for interconnecting the pair of bicycles in a side-by-side relationship comprising:
  (i) cross-bracing means for operatively connecting one of the pair of bicycles on its first side to the other of the pair of bicycles on its second side, the cross-bracing means comprising a plurality of brace members, each brace members having a first and a second end and having at least one receiving member at each of the first and second ends, each receiving member on the plurality of bracing members being operatively connected to a corresponding connecting member on one of the frame structures of the bicycles by a fastening member; and
  (ii) steering coupling means for coupling the steering assemblies of the bicycles such that the steering assemblies operate in unison; and
(c) vertical support means for balancing the dual recumbent vehicle in a vertical position with the forward ends of the frame structures of the pair of bicycles positioned generally above the rear ends, the vertical support means comprising at least three vertical support members extending generally toward the rear ends of the frame structures, each vertical support member having an end arranged and configured such that the ends of the vertical support members will support and balance the dual recumbent vehicle in the vertical position.

16. The dual recumbent vehicle of claim 15, wherein the vertical supporting means comprises at least three vertical support members on each bicycle, whereby each bicycle is capable of being balanced in the vertical position when the bicycles are not connected by the interconnecting means.

17. The dual recumbent vehicle of claim 15, wherein one of the plurality of bracing members comprises a U-shaped member, the U-shaped member operating as a bumper and as a handle for placing the dual recumbent vehicle in the vertical position.

18. A dual recumbent vehicle, comprising:
(a) a pair of recumbent bicycles, each bicycle having a first and a second side and a forward and a rear end, comprising:
  (i) a frame structure having a fork housing, a pair of parallel tubes extending from the fork housing towards the rear end, each of the parallel tubes having a rear mounting bracket for rotatably mounting a bicycle wheel therebetween, at least one cross-brace connected between the parallel tubes, a steer mechanism mounting plate connected between the parallel tubes, a steer mechanism fixed member mounted to the steer mechanism mounting plate, a front frame support connected between the fixed member and the fork housing a pedal assembly housing proximate the forward end, a bottom tube connected between the fork housing and the pedal assembly housing, and a derailed mount connected to the pedal assembly;
  (ii) a fork rotatable mounted in the fork housing, for rotatably mounting a bicycle wheel thereto;
  (iii) a front bicycle wheel rotatably mounted to the fork and a rear bicycle wheel rotatably mounted to the rear mounting brackets;
  (iv) an operator-controlled steer mechanism having a rotatable member rotatably connected to the fixed member, the rotatable member rotatable along a rotational axis and having at least one handlebar operatively connected thereto;
  (v) a tie rod operatively connected between the fork and the steer mechanism such that a rotation of the handlebar induces a rotation of the fork;
  (vi) a pedal assembly rotatably mounted in the pedal assembly housing;
  (vii) a freewheel assembly operatively connected to the rear bicycle wheel such that a rotation induced in the freewheel assembly in a forward direction induces a rotation in the rear bicycle wheel and a rotation induced in the freewheel assembly in a backward direction does not induce a rotation in the rear bicycle wheel;
  (viii) a chain operatively connecting the pedal assembly to the freewheel assembly such that a rotation induced in the pedal assembly induces a rotation of the freewheel assembly; and
  (vi) a recumbent seat having a seat mounting assembly operatively connected to the recumbent seat and slidably mounted on the pair of parallel tubes, the seat mounting assembly having a quick-release mechanism for selectively securing the seat mounting assembly at one of a plurality of positions on the pair of parallel tubes; and
(b) means for interconnecting the pair of bicycles in a side-by-side relationship comprising:
  (i) cross-bracing means for operatively connecting one of the pair of bicycles on its first side to the other of the pair of bicycles on its second side; and
  (ii) steering coupling means comprising a tie rod operatively connected between the forks on each of the bicycles, whereby a rotation of the handlebar on either of the bicycles induces a rotation of the forks on each of the bicycles.

19. The dual recumbent vehicle of claim 18, wherein the cross-bracing means comprises:
(a) a rear brace member operatively connected between the frame structures on each of the bicycles proximate the rear ends of each frame structure;
(b) a middle brace member operatively connected between the frame structures on each of the bicycles proximate the fork housings on each of the bicycles;
(c) a forward brace member operatively connected between the frame structures on each of the bicycles proximate the pedal assembly housings on each of the bicycles; and (d) a stabilizer member operatively connected between the frame structures on each of the bicycles between the rear and middle brace members, the stabilizer member comprising a leg member having two ends and a generally A-shaped member having two ends and a vertex, wherein the leg member is operatively connected to a center portion to the vertex of the A-shaped member, and wherein one end of the leg member and one end of the A-shaped member is operatively connected to the frame structures on each of the bicycles.

20. The dual recumbent vehicle of claim 19, wherein the frame structure of each bicycle has a plurality of connecting members, and wherein the cross-bracing means comprises a plurality of brace members, each brace member having a first and a second end and having at least one receiving member at each of the first and second ends, each receiving member on the plurality of bracing members being operatively connected to a corresponding connecting member on one of the frame structures of the bicycles by a fastening member.

21. The dual recumbent vehicle of claim 20, wherein:
   (a) each of the receiving members comprises a first side having a receiving recess defined therein along a receiving axis, a second side opposite the first side and having a receiving recess defined therein along the receiving axis, and a threaded aperture located between the first and second side receiving recesses along the receiving axis;
   (b) each of the connecting members comprises a peg defined along a connecting axis and sized to fit within a receiving recesses on a receiving member, and an aperture defined through the connecting member and peg along the connecting axis, and sized to receive a fastening member; and
   (c) each of the fastening members comprises a threaded fastener, whereby when a connecting member is arranged such that its peg is disposed within a receiving recesses on a receiving member, the connecting member is securable to the receiving member by threading a fastening member through the apertures in the connecting and receiving members.

22. The dual recumbent vehicle of claim 20, wherein the plurality of connecting members on each bicycle is comprised of a plurality of first connecting members and a plurality of second ocnnecting members, and wherein the plurality of first connecting members is for connecting the plurality of bracing members o the first side of the frame structure and the plurality of second connecting members is for connecting the plurality of bracing members to the second side of the frame structure, whereby each of the bicycles is interchangeable and can be operatively connected to the plurality of bracing members on its first or second side.

23. The dual recumbent vehicle of claim 22, wherein each bicycle further comprises a grab rail, the grab rail having at least one receiving member operatively connectable to at least one of the first connecting members and at least one of the second connecting members, whereby when the plurality of bracing members are connected to the firs side of the frame structure, the grab rail is operatively connected to the at least one of the second connecting members, and when the plurality of bracing members are connected to the second side of the frame structure, the grab rail is operatively connected to the at least one of the first connecting members.

* * * * *